(12) United States Patent
Ueda

(10) Patent No.: US 9,423,777 B2
(45) Date of Patent: Aug. 23, 2016

(54) MOTOR CONTROL DEVICE

(71) Applicant: Koichiro Ueda, Chiyoda-ku (JP)

(72) Inventor: Koichiro Ueda, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 63 days.

(21) Appl. No.: 14/379,621

(22) PCT Filed: Feb. 25, 2013

(86) PCT No.: PCT/JP2013/054715
§ 371 (c)(1),
(2) Date: Aug. 19, 2014

(87) PCT Pub. No.: WO2013/129294
PCT Pub. Date: Sep. 6, 2013

(65) Prior Publication Data
US 2015/0061564 A1 Mar. 5, 2015

(30) Foreign Application Priority Data
Mar. 1, 2012 (JP) ................................. 2012-045252

(51) Int. Cl.
*G05B 11/32* (2006.01)
*G05B 6/02* (2006.01)

(52) U.S. Cl.
CPC ........................................ *G05B 6/02* (2013.01)

(58) Field of Classification Search
CPC ... G05B 19/416; G05B 19/19; G05B 19/4141
USPC .................................................. 318/625, 560
See application file for complete search history.

(56) References Cited

U.S. PATENT DOCUMENTS 4,300,663 A * 11/1981 Hmelovsky ........... E05F 15/632
187/316
5,331,264 A * 7/1994 Cheng .................. G05B 19/416
318/560
(Continued)

FOREIGN PATENT DOCUMENTS

CN 1845021 A 10/2006
CN 101866166 A 10/2010
(Continued)

OTHER PUBLICATIONS

International Preliminary Report on Patentability and Written Opinion issued Sep. 12, 2014, in International Application No. PCT/JP2013/054715 (English translation only).
(Continued)

*Primary Examiner* — Rina Duda
(74) *Attorney, Agent, or Firm* — Oblon, McClelland, Maier & Neustadt, L.L.P.

(57) ABSTRACT

A command value generating circuit determines an acceleration profile indicating changes in acceleration of a mechanical load over time. The acceleration profile is determined such that the mechanical load is accelerated from a stop at a first position to a peak velocity, and is decelerated from the peak velocity to stop at a second position, and that the absolute value of an acceleration during accelerating and decelerating the mechanical load is equal to or less than an upper limit acceleration, and that the acceleration is maintained at the upper limit acceleration for a period of time from starting to accelerate the mechanical load, and then, gradually decreased from the upper limit acceleration. The command value generating circuit determines a velocity profile indicating changes in the velocity of the mechanical load over time, according to the acceleration profile, and generates a position command value, according to the velocity profile.

5 Claims, 13 Drawing Sheets

(56) References Cited

U.S. PATENT DOCUMENTS

| | | | | |
|---|---|---|---|---|
| 6,527,130 | B2* | 3/2003 | Ruddy | B66D 1/46 |
| | | | | 212/270 |
| 6,714,229 | B2* | 3/2004 | Miyazaki | B41J 29/377 |
| | | | | 347/223 |
| 7,158,900 | B2* | 1/2007 | McNutt | G05B 11/28 |
| | | | | 702/73 |
| 7,462,998 | B2* | 12/2008 | Akiyama | G05B 19/416 |
| | | | | 318/162 |
| 2004/0124802 | A1 | 7/2004 | Brogardh et al. | |
| 2006/0229745 | A1 | 10/2006 | Ueda et al. | |
| 2009/0177296 | A1 | 7/2009 | Ueda et al. | |
| 2010/0264867 | A1 | 10/2010 | Iwashita et al. | |
| 2013/0307459 | A1* | 11/2013 | Tian | G05B 19/416 |
| | | | | 318/570 |

FOREIGN PATENT DOCUMENTS

| | | |
|---|---|---|
| JP | 3 245208 | 10/1991 |
| JP | 4 24809 | 1/1992 |
| JP | 5 325446 | 12/1993 |
| JP | 7 244517 | 9/1995 |
| JP | 8 103821 | 4/1996 |
| JP | 2001 37080 | 2/2001 |
| JP | 2002-85871 A | 3/2002 |
| JP | 2004 522602 | 7/2004 |
| JP | 2006 293622 | 10/2006 |
| JP | 2007 241604 | 9/2007 |
| JP | 2009 98786 | 5/2009 |
| JP | 2010 250697 | 11/2010 |
| JP | 2011 145797 | 7/2011 |
| JP | 2012 192484 | 10/2012 |
| JP | 2012 192485 | 10/2012 |

OTHER PUBLICATIONS

Office Action issued on Jun. 2, 2015 in Japanese Patent Application No. 2014-502197 with partial English translation.

Combined Taiwanese Office Action and Search Report issued on Oct. 29, 2014, in Patent Application No. 102106862 with partial English translation and English translation of category of cited documents.

Office Action issued Sep. 16, 2015 in Korean Patent Application No. 10-2014-7024188 (with English language translation).

Nishioka, M., "Applied Cam Mechanism for Mechanical Engineers", Nikkan Kogyo Shimbun, Ltd., pp. xi, xii, 28-37, 54-55, (Jul. 31, 2003) (with partial English translation).

International Search Report Issued May 28, 2013 in PCT/JP13/054715 Filed Feb. 25, 2013.

Office Action issued Mar. 3, 2016 in Chinese Patent Application No. 201380012087.8 (with partial English translation).

\* cited by examiner

MOTOR CONTROL DEVICE

TECHNICAL FIELD

The present invention relates to motor control apparatuses for controlling the operation of various types of motors, such as servo motors.

BACKGROUND ART

Due to the recent growing consciousness of energy-saving, there has been a demand for reducing the electric energy consumption as much as possible when various types of industrial machines perform positioning control using a motor, such as a servo motor.

Thus, inventions of Patent Documents 1 to 7 are published as methods for thus reducing electric energy consumption during positioning control.

Patent Document 1 discloses a head positioning apparatus which aims to reduce electric energy consumption according to a user's use, and to efficiently perform positioning control regardless of changes in temperature, deterioration over time, etc. A velocity profile store unit stores target velocity profiles A and B in advance, the target velocity profile A supporting high-speed seek, and the target velocity profile B supporting low-speed seek with low electric energy consumption, such that the user can select the profile A or B. A subtracter compares a current track position of a head with a target position to produce a position error signal. A target velocity setting unit outputs a target velocity of the head, based on the position error signal, and based on the target velocity profile A or B in the velocity profile store unit. A control unit calculates a drive current for a head driving motor, based on a velocity error signal and servo control constants. The calculated drive current is inputted to a motor driving unit. A drive current initial value store unit stores an initial value of the drive current. A comparator compares the current drive current with the initial value. A servo control constant adjusting unit adjusts the servo control constants of the control unit, based on the result of the comparison made by the comparator. Both the target velocity profiles A and B have a triangular shape. In particular, the target velocity profile B reduces electric energy consumption by increasing the seek time instead of reducing the seek velocity.

Patent Document 2 discloses a method for thermal optimization, which aims to obtain a method for optimizing the movement performance of a robot with respect to the electric power loss in the driving system of the robot. The method of Patent Document 2 is a method for optimizing the movement performance of an industrial robot for a current movement path with respect to electric power losses in the driving system of the robot. The method includes the steps of calculating the electric power losses for the whole or part of the movement path for at least one component in the system, comparing the calculated electric power losses with a maximally allowed electric power loss for the component, and depending on the comparison, adjusting a course of accelerations and velocities for the current movement path.

Patent Document 3 discloses a method for generating command pattern, which aims to generate a command pattern that minimizes the temperature rise of a drive motor, when an amount of movement and a tact are specified. According to the method of Patent Document 3, by determining two of four parameters, i.e., an amount of movement $\theta$max, a tact "tact", a maximum velocity $\omega$max, and a maximum acceleration $\alpha$max, the two parameters including at least the maximum velocity $\omega$max or the maximum acceleration $\alpha$max, then the amount of movement $\theta$max and a tact "tact" are determined, and a parabolic velocity command pattern is generated, which has the velocity of 0 at time 0 and at time tact, and has an area equal to the amount of movement $\theta$max. The velocity command pattern is parabolically shaped to minimize copper losses.

Patent Document 4 discloses a control apparatus for a machine tool, which aims to optimally reduce the overall electric energy consumption of the machine tool. The apparatus of Patent Document 4 is provided with: first electric energy consumption calculation means for calculating the electric energy consumption of a feed shaft driving motor; second electric energy consumption calculation means for calculating the electric energy consumption of a device that operates at constant electric power; and motor control means for determining a time constant relatively related to at least one of the accelerating time and decelerating time of the feed shaft driving motor, and controlling the feed shaft driving motor based on the time constant, the time constant being determined based on the sum of the electric energy calculated by the first electric energy consumption calculation means and the electric energy calculated by the second electric energy consumption calculation means. The time constant is determined so as to minimize the sum of the electric powers.

Patent Document 5 discloses a trajectory generating apparatus capable of reducing required energy. The trajectory generating apparatus of Patent Document 5 generates a trajectory through interpolation of a sequence of points with a clothoid curve. The trajectory generation apparatus is provided with an arithmetic processing unit having clothoid curve generating means. The clothoid curve is a triple-clothoid curve, thus ensuring continuity in tangential direction and continuity in curvature at a point through which the curve passes. In the case that its end point is connected to a straight line, its tangential direction is made identical to a direction of the straight line.

Patent Document 6 discloses a control apparatus for a robot, which aims to reduce energy consumption during PTP (point to point) operation, without increasing operating time. The apparatus of Patent Document 6 determines, in control of a multi-axis motor with a common bus, a moment at which each axis command operation starts, such that decelerating operations of a plurality of axes do not overlap each other. The apparatus prevents regenerative energy from increasing as a result of the decelerating operations overlapping each other, and prevents the regenerative energy from being consumed by a regenerative resistor.

Patent Document 7 also discloses a control apparatus for a robot, which aims to reduce energy consumption during PTP operation, without increasing operating time. The apparatus of Patent Document 7 computes, in control of a multi-axis motor, the operating times of a plurality of axes, and increases command times for shorter operating times in accordance with the longest operating time, thus reducing the electric energy consumption.

CITATION LIST

Patent Documents

[Patent Document 1] Japanese Patent Laid-open Publication No. H05-325446
[Patent Document 2] Japanese Patent Laid-open Publication No. 2004-522602
[Patent Document 3] Japanese Patent Laid-open Publication No. 2007-241604

[Patent Document 4] Japanese Patent Laid-open Publication No. 2010-250697

[Patent Document 5] Japanese Patent Laid-open Publication No. 2011-145797

[Patent Document 6] Japanese Patent Laid-open Publication No. 2012-192484

[Patent Document 7] Japanese Patent Laid-open Publication No. 2012-192485

SUMMARY OF INVENTION

Technical Problem

Patent Document 1 discloses only the case of a triangular velocity profile. Thus, there is a problem of being unable to achieve sufficient energy saving by changing the velocity profile according to operating conditions.

Patent Document 2 discloses minimization of heat and loss during the positioning control, but does not disclose minimization of overall energy including work.

Further, in general, when a motor or a mechanical load is driven, there is an upper limit acceleration allowed during operation. When the invention of Patent Document 3 is implemented, there is a problem of exceeding the upper limit acceleration during the operation, depending on a travel distance or a travel time of a load.

The invention of Patent Document 4 optimizes only a time constant relatively related to at least one of the accelerating time and decelerating time of a motor, however, can not handle the case in which a motor and a mechanical load have an upper limit acceleration.

The invention of Patent Document 5 also can not handle the case in which a motor and a mechanical load have an upper limit acceleration.

Patent Document 6 does not disclose reduction in the electric energy consumption during the positioning control of a single-axis motor.

Patent Document 7 also does not disclose reduction in the electric energy consumption during the positioning control of a single-axis motor.

An object of the present invention is to solve the above-described problems, and provide a motor control apparatus for controlling the operation of a motor so as to reduce the electric energy consumption during the positioning control.

Solution to Problem

According to a motor control apparatus of an aspect of the present invention, a motor control apparatus is provided for controlling a motor to move a mechanical load from a first position to a second position, the mechanical load being connected to the motor. The motor control apparatus is provided with: a command value generating circuit configured to generate a position command value indicating a desired position of the mechanical load for each point of time; and a motor driver circuit configured to control the motor to move the mechanical load according to the position command value. The command value generating circuit is configured to: determine an acceleration profile A(t) indicating changes in acceleration of the mechanical load over time, such that the mechanical load is accelerated from a stop at the first position to a peak velocity, and is decelerated from the peak velocity to stop at the second position, and that an absolute value of acceleration during accelerating and decelerating the mechanical load is equal to or less than a predetermined upper limit acceleration $A_{max}$, and that the acceleration is maintained at the upper limit acceleration $A_{max}$ for a period of time from starting to accelerate the mechanical load, and then, is continuously decreased from the upper limit acceleration $A_{max}$; determine a velocity profile indicating changes in velocity of the mechanical load over time, according to the acceleration profile A(t); and generate the position command value, according to the velocity profile.

Advantageous Effects of Invention

According to the motor control apparatus of the present invention, it is possible to reduce the electric energy consumption during positioning control.

DESCRIPTION OF EMBODIMENTS

First Embodiment

Figure 1:
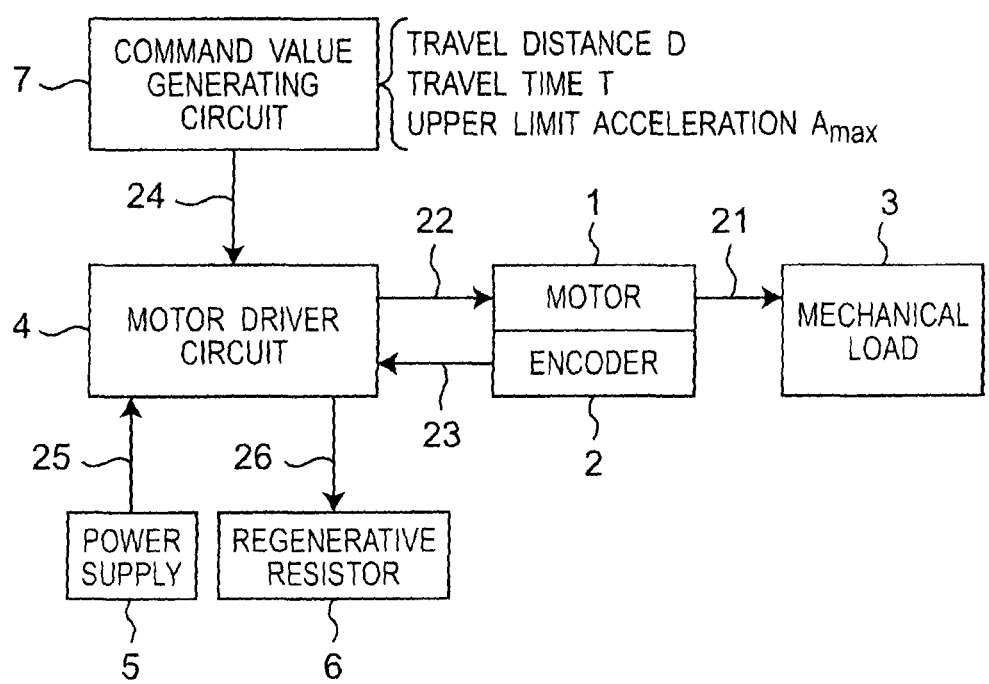
FIG. 1 is a block diagram showing a configuration of a positioning system including a motor control apparatus according to a first embodiment of the present invention.

FIG. 1 is a block diagram showing a configuration of a positioning system including a motor control apparatus according to a first embodiment of the present invention. In the positioning system of FIG. 1, the motor control apparatus is provided with a command value generating circuit 7, a motor driver circuit 4, and a regenerative resistor 6, and controls a motor 1 to move a mechanical load 3 connected to the motor 1, from an initial position (first position) to a target position (second position). The positioning system of FIG. 1 is further provided with a power supply 5 and an encoder 2.

The motor 1 operates with a current 22 supplied from the motor driver circuit 4, and provides driving force 21, such as torque or thrust, to the mechanical load 3. The mechanical load 3 is assumed to be, for example, a ball screw mechanism, but not limited thereto. The encoder 2 detects motor information 23, such as the rotational position (angle) and rotational speed of a rotating shaft of the motor 1, and sends the motor information 23 to the motor driver circuit 4. The rotational position and rotational speed of the rotating shaft of the motor 1, which are included in the motor information 23, correspond to the position and velocity of the mechanical load 3.

The command value generating circuit 7 generates a position command value 24 indicating a desired position of the mechanical load 3 for each point of time. Command value generation information, including a travel distance D, a travel time T, and an upper limit acceleration $A_{max}$, is inputted to the command value generating circuit 7 from an upper-layer apparatus (not shown), such as a Programmable Logic Controller (PLC) or a console panel. The travel distance D indicates the amount of movement from the initial position to the target position of the mechanical load 3. The travel time T indicates the time required to move the mechanical load 3 from the initial position to the target position. The travel time T inputted to the command value generating circuit 7 as the command value generation information is any desired value. The upper limit acceleration $A_{max}$ indicates the upper limit value of an acceleration that can be applied to the mechanical load 3 by the motor 1 (e.g., an acceleration determined by the structural constraints of the mechanical load 3, or an acceleration specified by a user of the motor control apparatus, etc.). Based on the inputted command value generation information, the command value generating circuit 7 performs a position command value generating process, which will be described later with reference to FIG. 2, to generate a position command value 24. Since the rotational position and rotational speed of the rotating shaft of the motor 1 are detected as information corresponding to the position and velocity of the mechanical load 3 as described above, in practice, the position command value 24 indicates a desired rotational position of the rotating shaft of the motor 1 for each point of time.

The motor driver circuit 4 controls the motor 1 to move the mechanical load 3 according to the position command value 24. When a servo motor is used as the motor 1, the motor driver circuit 4 is a servo amplifier. The motor driver circuit 4 is provided with a power converter, such as a PWM inverter, and generates a current 22 to be supplied to the motor 1, using electric power 25 supplied from the power supply 5. The motor driver circuit 4 includes a feedback control system for making the rotational position (actual position) of the rotating shaft of the motor 1 detected by the encoder 2, follow the position command value 24 (desired position) sent from the command value generating circuit 7. Thus, the motor driver circuit 4 computes and generates a current 22 for driving the motor 1 such that the rotational position of the rotating shaft of the motor 1 follows the position command value 24, and supplies the generated current 22 to the motor 1.

The power supply 5 is, for example, a three-phase AC power supply or a single-phase AC power supply.

The regenerative resistor 6 consumes regenerative power 26 when the motor 1 is in a regenerative state.

The position command value 24 generated by the command value generating circuit 7 is further described below. The command value generating circuit 7 first determines an acceleration profile A(t) indicating changes in the acceleration of the mechanical load 3 over time, determines a velocity profile indicating changes in the velocity of the mechanical load 3 over time, according to the acceleration profile A(t), and generates a position command value 24, according to the velocity profile. In this case, the acceleration profile A(t) is determined such that the mechanical load 3 is accelerated from a stop at an initial position to a peak velocity $V_p$, and is decelerated from the peak velocity $V_p$ to stop at a target position, and that the absolute value of an acceleration during accelerating and decelerating the mechanical load 3 is equal to or less than the upper limit acceleration $A_{max}$, and that the acceleration is maintained at the upper limit acceleration $A_{max}$ for a certain period of time from starting to accelerate the mechanical load 3, and then, is gradually decreased from the upper limit acceleration $A_{max}$.

Specifically, the command value generating circuit 7 determines an acceleration profile A(t) such that, when a certain travel time T is provided, the mechanical load 3 is moved from an initial position to a target position in the travel time T, where the travel time T is longer than a shortest travel time $T_0 = 2 \times \sqrt{D/A_{max}}$ based on a travel distance D and the upper limit acceleration $A_{max}$. In particular, the shortest travel time $T_0$ is determined as a time from when the mechanical load 3 is accelerated at the upper limit acceleration $A_{max}$ from a stop at the initial position to a certain peak velocity, and is decelerated at the upper limit acceleration $A_{max}$ at a moment when the mechanical load 3 has reached the peak velocity, until the mechanical load 3 is stopped at the target position. The command value generating circuit 7 may compute a shortest travel time $T_0 = 2 \times \sqrt{D/A_{max}}$ required to move the mechanical load 3 from the initial position to the target position, based on the travel distance D and the upper limit acceleration $A_{max}$, and determine a certain travel time T longer than the shortest travel time $T_0$. If a travel time T inputted to the command value generating circuit 7 as the command value generation information is longer than the shortest travel time $T_0$, the command value generating circuit 7 uses the travel time T itself. Otherwise, the command value generating circuit 7 determines and uses a certain travel time T longer than the shortest travel time $T_0$, instead of the inputted travel time T.

The area of the velocity profile integrated over the travel time T is the travel distance D.

In embodiments of the present invention, we propose acceleration profiles A(t) having various shapes (therefore, velocity profiles having various shapes). In the embodiments of the present invention, it is possible to reduce the electric energy consumption during positioning operation using these acceleration profiles A(t). Here, the amount of electric energy does not mean electric energy per unit time, but means the total amount of electric energy during positioning operation (an integrated amount of electric energy obtained by integrating or accumulating electric power per unit time during the positioning operation).

Figure 2:
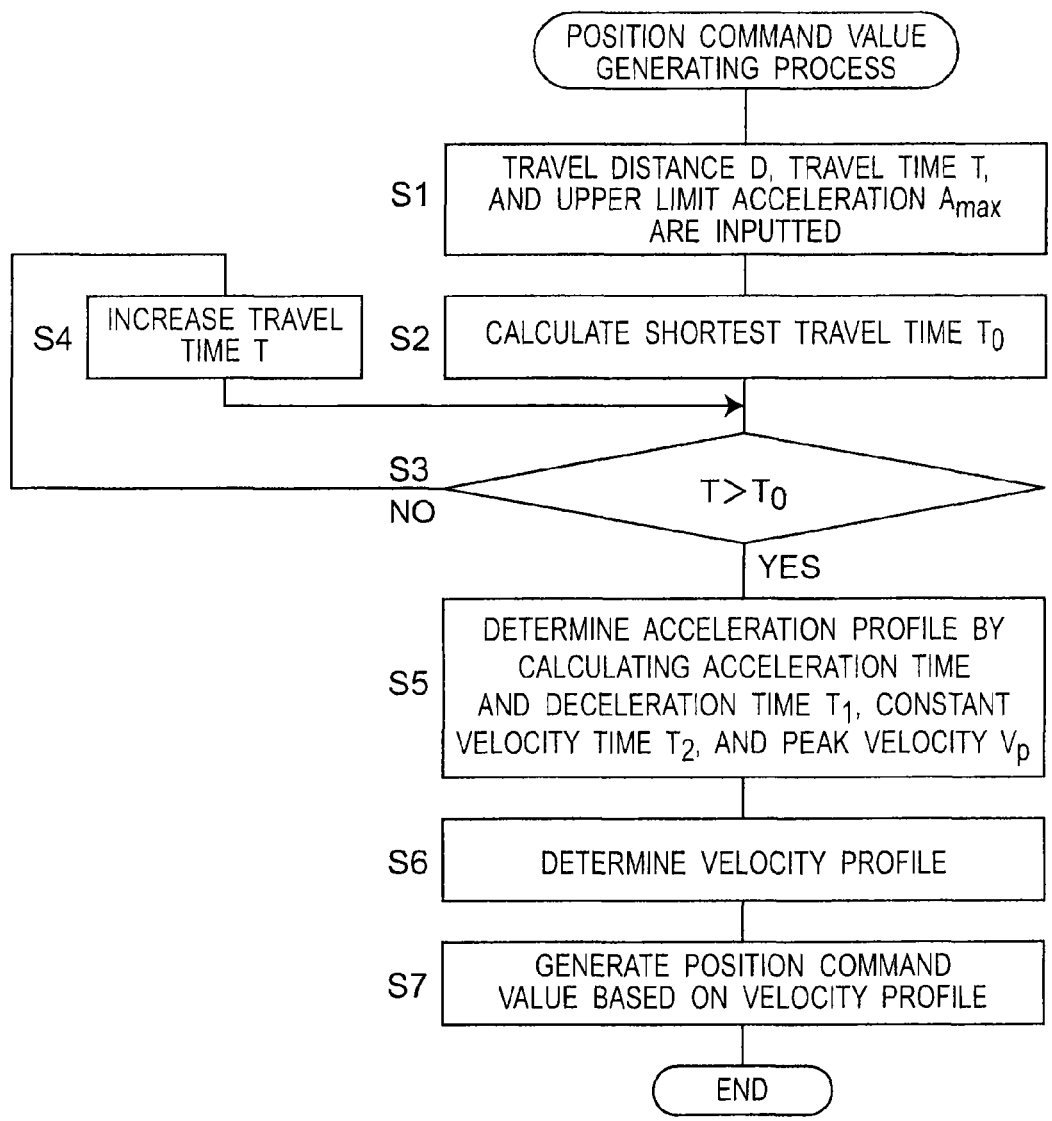
FIG. 2 is a flowchart showing a position command value generating process performed by a command value generating circuit 7 of FIG. 1.

FIG. 2 is a flowchart showing a position command value generating process performed by the command value generating circuit 7 of FIG. 1. In the present embodiment, an acceleration profile A(t) includes: an accelerating time during which the mechanical load 3 is accelerated at a first acceleration from a stop at an initial position to a peak velocity $V_p$; a constant velocity time during which the mechanical load 3 is moved at the peak velocity $V_p$; and a decelerating time during which the mechanical load 3 is decelerated at a second acceleration from the peak velocity $V_p$ to stop at a target position. The absolute value of the first and second accelerations is the upper limit acceleration $A_{max}$. Therefore, the present embodiment is characterized by generating a trapezoidal velocity profile.

At step S1, a travel distance D, a travel time T, and an upper limit acceleration $A_{max}$ are inputted to the command value generating circuit 7. At step S2, the command value generating circuit 7 computes a shortest travel time $T_0$. At step S3, the command value generating circuit 7 determines whether or not the travel time T is longer than the shortest travel time $T_0$; if YES, the process proceeds to step S5, and if NO, at step S4, the command value generating circuit 7 increases the travel time T, and the process returns to step S3. At step S4, the command value generating circuit 7 may increase the travel time T, for example, in increments of 10 percent, but not limited thereto.

At step S5, the command value generating circuit 7 computes an accelerating time and a decelerating time $T_1$, a constant velocity time $T_2$, and a peak velocity $V_p$. The length of the accelerating time and the decelerating time $T_1$ and the length of the constant velocity time $T_2$ are given as follows.

[Math. 1]

$$T_1 = \frac{1}{2}\left(T - \sqrt{T^2 - 4\frac{D}{A_{max}}}\right) \quad (1)$$

[Math. 2]

$$T_2 = \sqrt{T^2 - 4\frac{D}{A_{max}}} \quad (2)$$

In addition, the peak velocity $V_p$ is given by: $V_p = A_{max} \times T_1$.

At step S5, the command value generating circuit 7 further determines an acceleration profile A(t) based on the computed accelerating time and decelerating time $T_1$, constant velocity time $T_2$, and peak velocity $V_p$. At step S6, the command value generating circuit 7 determines a velocity profile by integrating the acceleration profile A(t). At step S7, the command value generating circuit 7 generates a position command value 24 by integrating the velocity profile, and the process ends.

Next, the advantageous effects of the motor control apparatus according to the present embodiment is described below.

First, the reason of using the upper limit acceleration for the positioning control is described below. The motor 1 has a maximum torque as normally available output, depending on the type of the motor 1. Since the moment of inertia of the mechanical load 3 is constant during the positioning control, the proportionality between acceleration and torque is derived from the relationship of the equation of motion ("moment of inertia"ב"acceleration"=torque). According to this fact, if there is a maximum torque, an upper limit occurs in an acceleration that can be applied to the mechanical load 3 by the motor 1 during the positioning control (upper limit acceleration). In addition, there may be an upper limit to an acceleration allowable by the mechanical load 3 itself. This also results in an upper limit to an acceleration during the positioning control. If an acceleration exceeding the upper limit acceleration is applied to the mechanical load 3, an excessive current flows through the motor 1, or a strong shock is applied to the mechanical load 3. At the worst, there is a possibility that the motor 1, the motor driver circuit 4, and/or the mechanical load 3 may be broken. Therefore, it is necessary to consider the upper limit acceleration when generating a position command value 24.

Figure 3:
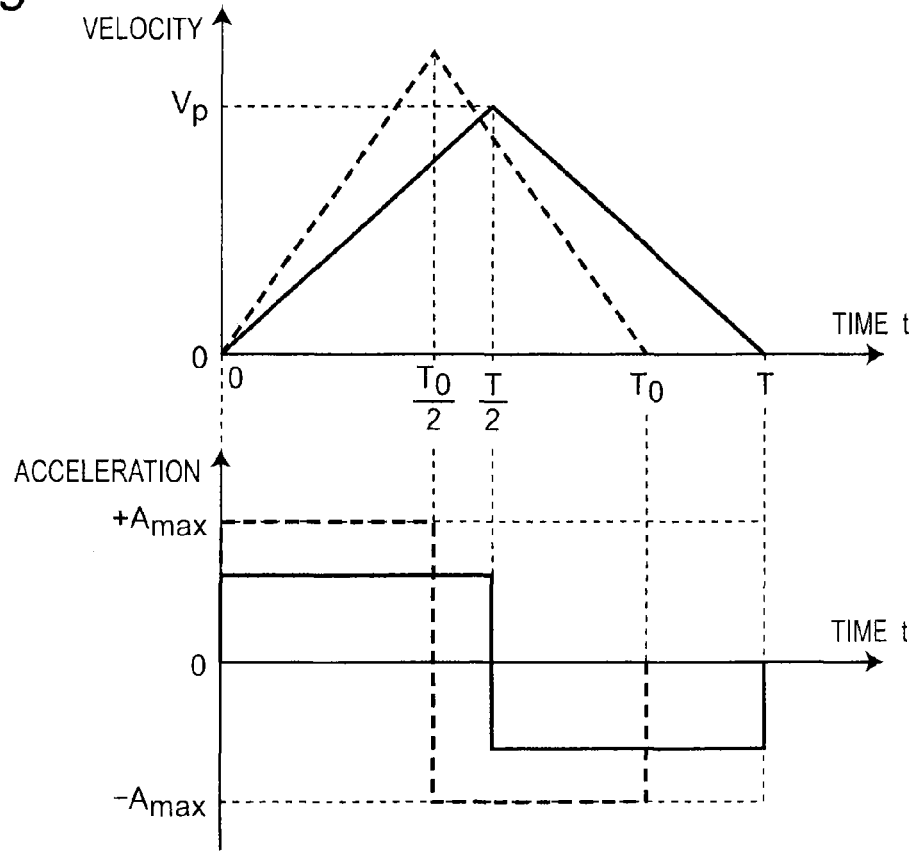
FIG. 3 is a schematic diagram showing an acceleration profile and a velocity profile in explanation of a shortest travel time $T_0$.

In order to minimize the travel time T required to move the mechanical load 3 from an initial position to a target position taking the upper limit acceleration into consideration, it is known to perform the so-called minimum time control (Bang-Bang control). FIG. 3 is a schematic diagram showing an acceleration profile and a velocity profile in explanation of a shortest travel time $T_0$. Referring to FIG. 3, thick dashed lines indicate an acceleration profile and a velocity profile, which are obtained by the minimum time control. The travel time achieved when performing the minimum time control, i.e., the shortest travel time $T_0$, is given by: $T_0 = 2 \times \sqrt{D/A_{max}}$ based on a travel distance D and an upper limit acceleration $A_{max}$. In this case, an acceleration profile is determined such that the mechanical load 3 is accelerated at the upper limit acceleration $A_{max}$ from time 0 to time $T_0/2$, i.e., one-half of the shortest travel time, and is decelerated at the upper limit acceleration $A_{max}$ from time $T_0/2$ to the shortest travel time $T_0$. Therefore, the mechanical load 3 is accelerated at the upper limit acceleration $A_{max}$ from a stop at an initial position to a certain peak velocity, and is decelerated at the upper limit acceleration $A_{max}$ at a moment when the mechanical load 3 has reached the peak velocity, to stop at a target position. A velocity profile obtained when performing the minimum time control becomes triangular. When there is an upper limit acceleration $A_{max}$, it is not possible to move the mechanical load 3 in a shorter travel time than the shortest travel time $T_0$. Only when the mechanical load 3 is moved according to a position command value 24 generated from the acceleration profile and the velocity profile indicated by the thick dashed lines of FIG. 3, it is possible to achieve the minimum time control with the travel distance D and the travel time $T_0$, without exceeding the upper limit acceleration $A_{max}$.

Figure 4:
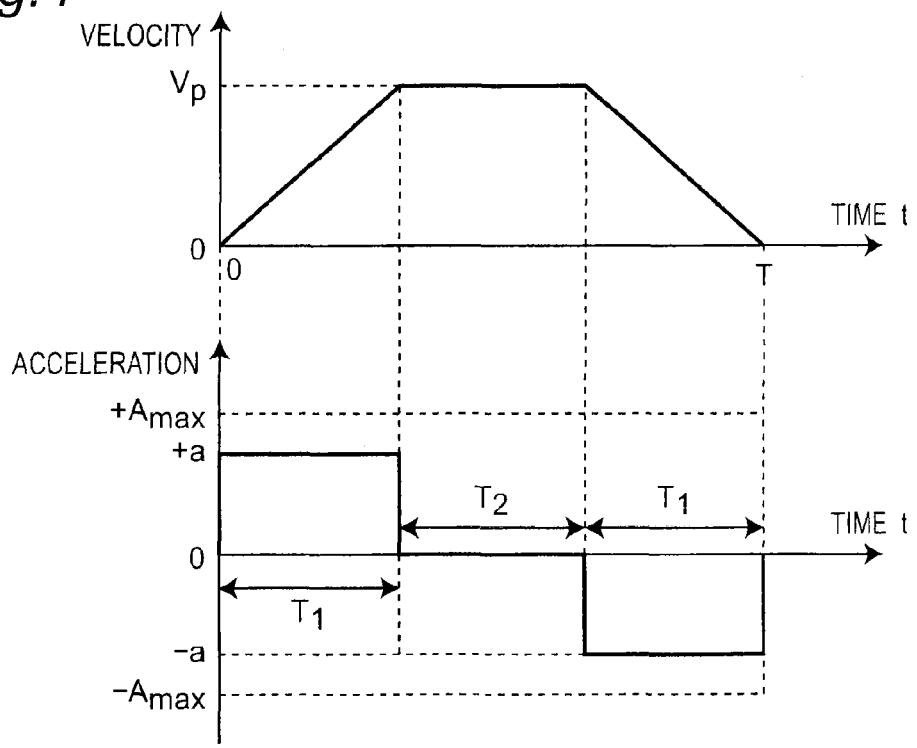
FIG. 4 is a schematic diagram showing an acceleration profile and a velocity profile, which are generated by the command value generating circuit 7 of FIG. 1.

If a travel time T equal to or less than the shortest travel time $T_0$ is inputted, the travel time T is increased to be longer than the shortest travel time $T_0$, and an acceleration profile A(t) and a velocity profile are determined based on the increased travel time T. In the position command value generating process of FIG. 2, when the travel time T is equal to or less than the shortest travel time $T_0$ (NO at step S3), the travel time T is increased (step S4), which aims to reduce the electric energy consumption during the positioning control. However, in the present embodiment, the velocity profile is not generated by simply reducing the absolute value of an acceleration according to the increase of the travel time T in excess of the shortest travel time $T_0$ (i.e., using a triangular velocity profile in a manner similar to that of the minimum time control), as indicated by thick solid lines of FIG. 3, but a trapezoidal velocity profile as shown in FIG. 4 is used. FIG. 4 is a schematic diagram showing an acceleration profile A(t) and a velocity profile, which are generated by the command value generating circuit 7 of FIG. 1. The acceleration profile A(t)

includes: an accelerating time during which the mechanical load 3 is accelerated at an acceleration "a" from a stop at an initial position to a peak velocity $V_p$; a constant velocity time during which the mechanical load 3 is moved at the peak velocity $V_p$; and a decelerating time during which the mechanical load 3 is decelerated at the acceleration "a" from the peak velocity $V_p$ to stop at a target position. The length of the accelerating time and the length of the decelerating time are equal to each other. When a travel distance D and a travel time T are provided, a trapezoidal velocity profile is uniquely determined based on, as a parameter, the acceleration "a" indicating the absolute value of an acceleration for the accelerating time and the decelerating time. With reference to FIG. 4, a preferred value of the acceleration "a" will be described below.

Using the acceleration "a" as a parameter, the accelerating time and the decelerating time $T_1$ and constant velocity time $T_2$ are given as follows.

[Math. 3]

$$T_1 = \frac{1}{2a}\left(aT - \sqrt{a^2T^2 - 4aD}\right) \quad (3)$$
$$= \frac{1}{2}\left(T - \sqrt{T^2 - 4\frac{D}{a}}\right)$$

[Math. 4]

$$T_2 = T - 2T_1 = \sqrt{T^2 - 4\frac{D}{a}} \quad (4)$$

The upper limit of the absolute value of the acceleration "a" is the upper limit acceleration $A_{max}$, and its lower limit is an acceleration obtained when the constant velocity time $T_2$ is 0, i.e., when the velocity profile becomes triangular. The lower limit $A_{min}$ of the absolute value of the acceleration "a" is given by: $A_{min}=4D/T^2$, from a relationship that the area of the velocity profile integrated over the travel time T is the travel distance D. Using the lower limit $A_{min}$ of the absolute value of the acceleration "a", the accelerating time and the decelerating time $T_1$ can be given as follows.

[Math. 5]

$$T_1 = \frac{1}{2a}\left(aT - \sqrt{a^2T^2 - 4aD}\right) \quad (5)$$
$$= \frac{T}{2a}\left(a - \sqrt{a^2 - A_{min} \cdot a}\right)$$

In addition, using the lower limit $A_{min}$ of the absolute value of the acceleration "a", the peak velocity $V_p$ of the velocity profile can be given as follows.

[Math. 6]

$$V_p = aT_1 = \frac{T}{2}\left(a - \sqrt{a^2 - A_{min} \cdot a}\right) \quad (6)$$

On the other hand, since the relationship $A_{max}=4D/T_0^2$ exists between the shortest travel time $T_0$, the travel distance D, and the upper limit acceleration $A_{max}$ obtained when performing the minimum time control, the upper limit acceleration $A_{max}$ is given by: $A_{max}=A_{min}\times T^2/T_0^2$. Thus, the range of a possible acceleration "a" is given as follows.

[Math. 7]

$$A_{min} \leq a \leq A_{min} \cdot \left(\frac{T}{T_0}\right)^2 \quad (7)$$

Next, the electric energy consumption during operation of the motor 1 is considered below. The key factors in consuming electric power during the operation of the motor 1 can be classified into two, motor output (work done by the motor 1), and losses due to consumption by resistance of windings of the motor 1, and the electric energy consumption is determined by the sum of them. Specifically, it can be considered that "the amount of electric energy required for the positioning control"="the amount of electric energy for the motor output"+"the amount of electric energy for the losses".

Motor output power W per unit time is given by: W=v×τ, based on the motor velocity v and the motor torque τ. In addition, the operating states of the motor 1 performing the positioning control according to the trapezoidal velocity profile of FIG. 4 can be classified into an "accelerating operating state" where the velocity increases, a "constant velocity operating state" where the velocity maintains a constant value, and a "decelerating operating state" where the velocity decreases. However, this classification can be applied not only to a trapezoidal velocity profile as shown in FIG. 4, but also to a velocity profile having a more general accelerating and decelerating pattern. In the following, the amount of electric energy for the motor output is computed for the respective operating states, when the motor 1 operates according to the trapezoidal velocity profile of FIG. 4.

First, when the motor 1 is in an accelerating operating state, i.e., when time t satisfies $0 \leq t \leq T_1$ in FIG. 4, the motor 1 generates a torque in the positive direction in order to generate an acceleration in the positive direction. Since the velocity is also positive, the sign of motor output power W per unit time is also positive. The amount of electric energy for the motor output during the period immediately after the motor 1 starts to accelerate (time t=0) until the motor 1 completes accelerating (time t=$T_1$) is calculated as follows.

[Math. 8]

$$\int_0^{T_1} W\,dt = \int_0^{T_1} v\tau\,dt \quad (8)$$
$$= J\int_0^{T_1} v\frac{dv}{dt}\,dt$$
$$= \frac{J}{2}\int_0^{T_1} \frac{d}{dt}(v^2)\,dt$$
$$= \frac{J}{2}[\{v(T_1)\}^2 - \{v(0)\}^2]$$
$$= \frac{1}{2}J \cdot V_p^2$$

In this case, the second equality holds from the equation of motion of the motor 1, J×dv/dt=τ, i.e., the proportionality between the torque τ and the acceleration dv/dt, where J denotes the sum of moments of inertia of the mechanical load 3 and the motor 1. The third equality holds from the product rule for differentiation. The fifth equality holds from the fact that the velocity v is 0 at the start of accelerating time (t=0), (v(0)=0), and that the velocity v is $V_p$ at the end of the accelerating time (t=$T_1$), (v($T_1$)=$V_p$). Finally, the amount of electric energy for the motor output in the accelerating operating state is given by: $\frac{1}{2} \times J \times V_{p2}$. This is equal to kinetic energy generated when the mechanical load 3 and the motor 1 operate at the peak velocity $V_p$.

In addition, when the motor 1 is in a constant velocity operating state, i.e., when time t satisfies $T_1 < t \leq T_1 + T_2$ in FIG. 4, the acceleration "a" is 0, and thus, a generated torque τ is also considered to be substantially 0. Hence, the motor output power W is also substantially 0, from the relationship W=v×τ.

Further, when the motor 1 is in a decelerating operating state, i.e., when time t satisfies $T - T_1 < t \leq T_1$ in FIG. 4, a negative acceleration is generated to reduce the velocity v. This requires generation of a negative torque. However, since the velocity v is in the positive direction, the velocity v and the torque τ have different signs, and the motor output power W per unit time has a negative value. The motor output power W having a negative value means that the motor 1 is in a regenerative state (regenerative power is generated), and accordingly, the motor 1 does not consume electric energy. The regenerative power is consumed by the regenerative resistor 6 of FIG. 1. Looking from a different perspective, it means that the kinetic energy obtained during the accelerating operating state is consumed by the regenerative resistor 6 during the decelerating operating state, and dissipated as thermal energy.

From the above consideration, the amount of electric energy for the motor output in the accelerating operating state is dominant in the amount of electric energy for the motor output during the positioning control. The amount of electric energy for the motor output in the accelerating operating state is equal to kinetic energy generated when the mechanical load 3 and the motor 1 operate at the peak velocity $V_p$. Thus, in order to reduce this amount of electric energy, it is necessary to reduce the kinetic energy, i.e., reduce the peak velocity $V_p$.

By differentiating the mathematical expression (6) with respect to the acceleration "a", the mathematical expression (6) indicating the relationship between the peak velocity $V_p$ and the acceleration "a" during the positioning control, the following mathematical expression is obtained.

[Math. 9]

$$\frac{dV_p}{da} = \frac{\sqrt{a^2 - A_{min} \cdot a} - \frac{1}{2}(2a - A_{min})}{\sqrt{a^2 - A_{min} \cdot a}} \quad (9)$$

Using a>0, a−$A_{min}$≥0, and the relationship "arithmetic mean>geometrical mean", the following mathematical expression holds for the numerator of the mathematical expression (9).

[Math. 10]

$$\sqrt{a^2 - A_{min} \cdot a} - \frac{1}{2}(2a - A_{min}) = \sqrt{a \cdot (a - A_{min})} - \frac{1}{2}(a + a - A_{min}) < 0 \quad (10)$$

Therefore, $dV_p/da$ of the mathematical expression (9) is negative. Hence, the higher the acceleration "a" is, the lower the peak velocity $V_p$ is. In particular, the peak velocity $V_p$ is minimized when the acceleration "a" is equal to the upper limit acceleration $A_{max}$. Since the kinetic energy is proportional to the square of velocity, the amount of electric energy for the motor output is also minimized when the acceleration "a" is equal to the upper limit acceleration $A_{max}$.

Next, the magnitude of losses due to consumption by resistance of windings of the motor 1 is computed, among the amount of electric energy required during the positioning control, when performing the positioning control according to the trapezoidal velocity profile of FIG. 4. Let R be the resistance of windings of the motor 1, and I be the current flowing through the motor 1, the electric power loss L per unit time is given as follows.

$$L = R \times I^2 \quad (11)$$

A torque τ of the motor 1 is generated in proportion to the current I of the motor 1. Specifically, let $K_T$ be the constant of proportionality (torque constant), the relationship τ=$K_T$×I holds. By substituting this relationship into the equation of motion, the following relationship holds.

$$J \times a = K_T \times I \quad (12)$$

Therefore, using the acceleration "a", the current I is given as follows.

$$I = J \times a / K_T \quad (13)$$

Thus, it can be said that the current I flowing through the motor 1 is proportional to the acceleration "a".

The amount of electric energy for the motor output is computed for each of the "accelerating operating state", the "constant velocity operating state", and the "decreasing operating state". Similarly, losses occurring in the motor 1 are also computed for each of these operating states. When the motor 1 is in the accelerating operating state, the acceleration "a" is not 0. Therefore, from the mathematical expression (13), the current I is also not 0. Therefore, electric power loss L occurs according to the mathematical expression (11), and an amount of electric energy corresponding to the electric power loss L is consumed. When the motor 1 is in the constant velocity operating state, the acceleration "a" is 0, and thus, the current I can be also considered to be almost 0. Therefore, in this case, the electric power loss L can be also considered to be substantially 0. In addition, when the motor 1 is in the decelerating operating state, a current I generates along with generation of a negative torque. However, as described above, when the motor 1 is in the decelerating operating state, regenerative power generates. Therefore, the regenerative power compensates for electric power loss L occurring during the decelerating operating state. Further, remaining regenerative power is consumed by the regenerative resistor 6. Therefore, in the decelerating operating state, almost no electric energy is required to compensate for losses. Thus, the amount of electric energy for the losses in the accelerating operating state is dominant also in the amount of electric energy for the losses during the positioning control. Thus, it can be said that the amount of electric energy during the accelerating operating state is dominant in the amount of electric energy required for positioning operation. Using the mathematical expressions (11) and (13), the amount of electric energy for the losses E(a) in the accelerating operation state, i.e., the amount of electric energy obtained by integrating the electric power loss L over accelerating time (0≤t≤$T_1$), is given with respect to the acceleration "a" as follows.

[Math. 11]

$$E(a) = \int_0^{T_1} R \cdot I^2 \, dt \quad (14)$$
$$= R\left(\frac{J}{K_t}\right)^2 \int_0^{T_1} a^2 \, dt$$
$$= R\left(\frac{J}{K_t}\right)^2 a^2 T_1$$
$$= R\left(\frac{J}{K_t}\right)^2 \frac{T}{2}\left(a^2 - a\sqrt{a^2 - A_{min} \cdot a}\right)$$

We examine how the amount of electric energy for the losses $E(a)$ of the mathematical expression (14) changes according to a change in acceleration "a". In this case, it is to be noted that the values of resistance of windings R, moment of inertia J, and torque constant $K_T$ are fixed once the motor 1 and the mechanical load 3 are determined.

Figure 5:
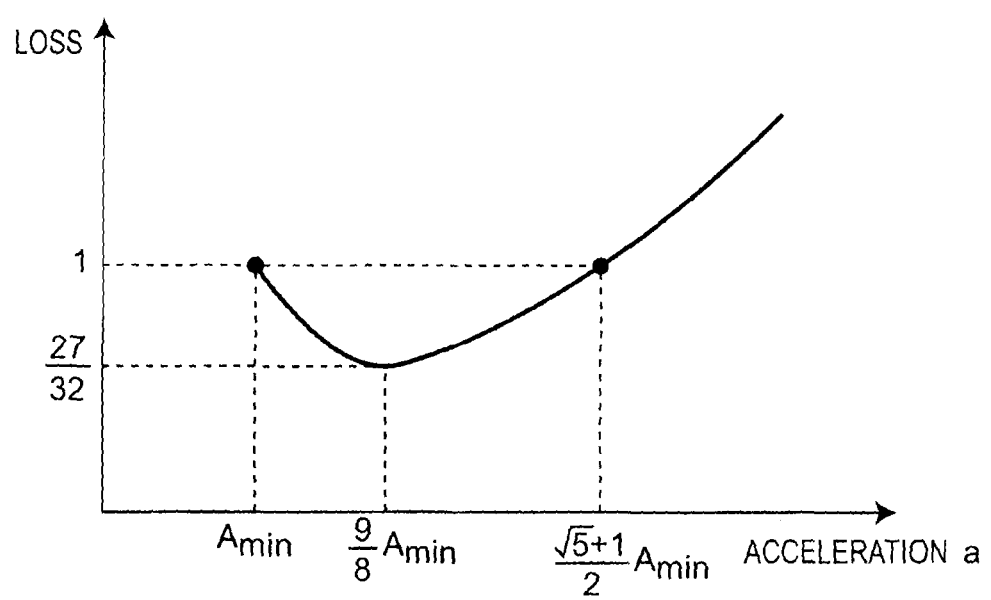
FIG. 5 is a schematic diagram showing changes in loss with respect to an acceleration "a".

FIG. 5 is a schematic diagram showing changes in loss with respect to the acceleration "a". The vertical axis in FIG. 5 indicates a value obtained by dividing the amount of electric energy for the losses $E(a)$ of the mathematical expression (14), by $R \times (J/K_T)^2 \times T/2 \times A_{min}^2$. Referring to FIG. 5, when "a" satisfies $A_{min} \leq a < (9/8) \times A_{min}$, the loss monotonously decreases as the acceleration "a" increases. The loss is minimized at: $a=(9/8) \times A_{min}$. When using the loss occurring at: $a=A_{min}$ as a unit, the loss is 27/32 at: $a=(9/8) \times A_{min}$. When "a" satisfies $a > (9/8) \times A_{min}$, the loss monotonously increases as the acceleration "a" increases. Further, at: $a=(\sqrt{5}+1)/2 \cdot A_{min}$, the loss is the same as that of: $a=A_{min}$.

Under the above mentioned conditions, we consider under what circumstances the amount of electric energy required for the positioning control is minimized according to the acceleration "a" and the travel time T, when performing the positioning control according to the trapezoidal velocity profile of FIG. 4.

It is to be noted that, as described above, the amount of electric energy required for the positioning control is the sum of the amount of electric energy for the motor output and the amount of electric energy for the losses. First, in the case of $A_{max} \leq (9/8) \times A_{min}$, i.e., in the case of $T_0 < T \leq 3\sqrt{2}/4 \cdot T_0$ by taking the relationship $A_{max} = A_{min} \times T^2/T_0^2$ into consideration, the amount of electric energy required for the positioning control is minimized when the acceleration "a" is set to the upper limit acceleration $A_{max}$. This is because, as described above, when the acceleration "a" is the upper limit acceleration $A_{max}$, the peak velocity $V_p$ is minimized, and the kinetic energy is also minimized. Therefore, the amount of electric energy for the motor output is minimized. In addition, according to FIG. 5, in case of: $a \leq (9/8) \times A_{min}$, the loss monotonously decreases with the increase in acceleration "a", and thus, the amount of electric energy for the losses is also minimized. Hence, the amount of electric energy required for the positioning control, which is the sum of the amount of electric energy for the motor output and the amount of electric energy for the losses, is minimized.

Next, also in case of $(9/8)A_{min} < A_{max} \leq (\sqrt{5}+1)/2 \cdot A_{min}$, i.e., $3\sqrt{2}/4 \cdot T_0 < T \leq \sqrt{(\sqrt{5}+1)/2} \cdot T_0$, the amount of electric energy for the motor output is minimized when the acceleration "a" is set to the upper limit acceleration $A_{max}$, in a manner similar to that of the above-described case. When the acceleration "a" is set to the upper limit acceleration $A_{max}$, the amount of electric energy for the losses is not minimized. However, at least, the amount of electric energy for the losses becomes smaller than the amount of electric energy for the losses occurring when the acceleration "a" is set to its lower limit $A_{min}$, i.e., when performing the positioning control according to a triangular velocity profile. Therefore, there is such an advantageous effect that, when the acceleration "a" is set to the upper limit acceleration $A_{max}$, the amount of electric energy required for the positioning control can be smaller than at least the amount of electric energy consumed when using a triangular velocity profile common for the positioning control.

The accelerating time and decelerating time $T_1$, the constant velocity time $T_2$, and the peak velocity $V_p$ which are computed at step S5 of FIG. 2 are values obtained by substituting $a=A_{max}$ into the mathematical expressions (3), (4), and (6). In addition, the mathematical expressions (3), (4), and (6) do not include iterations, etc., during their computation, but include only algebraic operations. Therefore, there is such an advantageous effect that a position command value 24 can be generated with a small computation load.

As described above, according to the motor control apparatus of the present embodiment, it is possible to reduce the electric energy consumption during the positioning control.

Second Embodiment

In the first embodiment, the positioning control is performed according to a trapezoidal velocity profile in order to reduce the electric energy consumption. On the other hand, in the present embodiment, a different velocity profile is used. A positioning system including a motor control apparatus according to a second embodiment is configured in a manner similar to that of the first embodiment (FIG. 1), except that a command value generating circuit 7 performs a position command value generating process different from that of the first embodiment.

Figure 6:
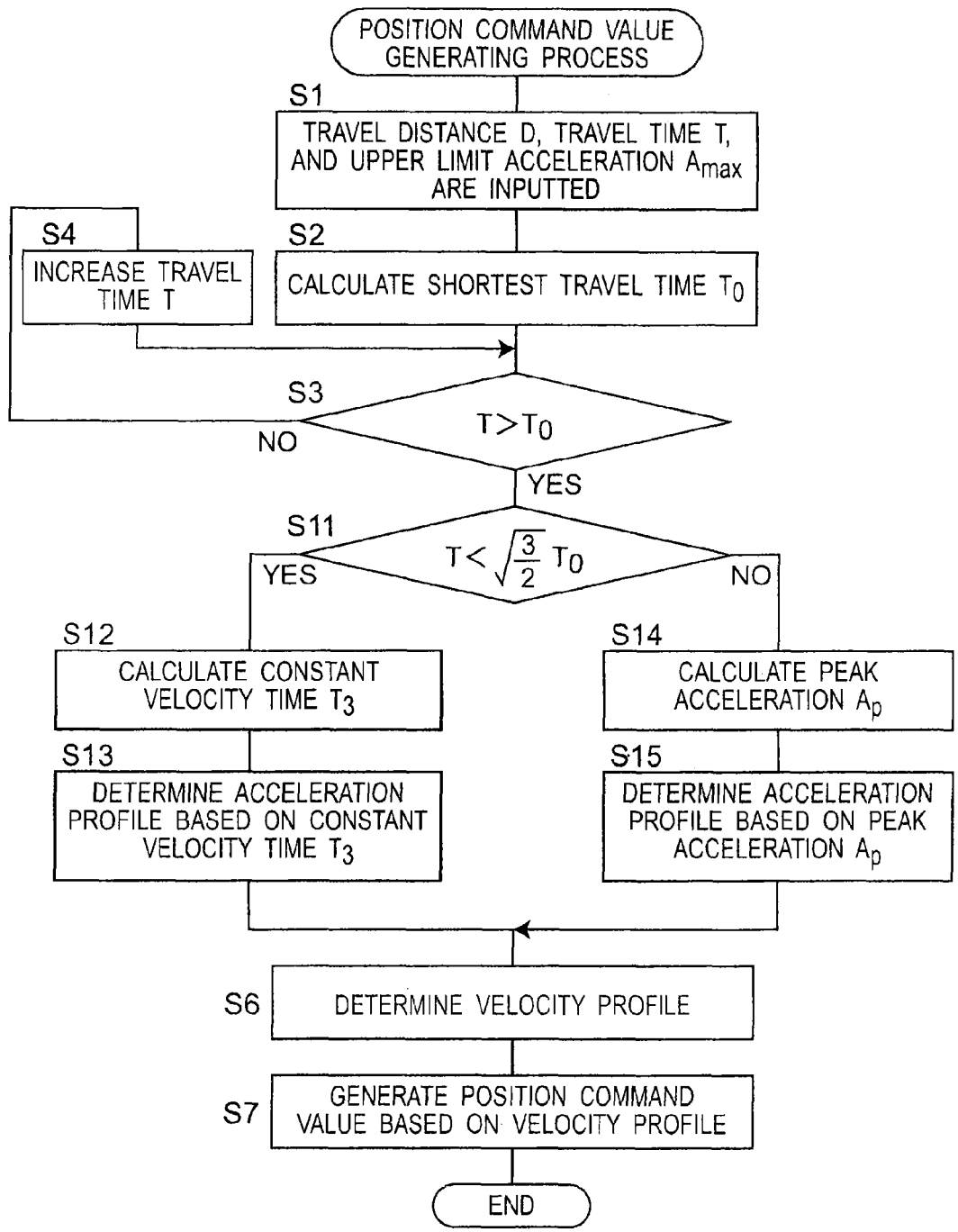
FIG. 6 is a flowchart showing a position command value generating process according to a second embodiment of the present invention.

FIG. 6 is a flowchart showing a position command value generating process according to the second embodiment of the present invention. In the flowchart of FIG. 6, steps S1 to S4 are the same as those of the first embodiment (FIG. 2), and their explanations are omitted. When YES at step S3, the process proceeds to step S11. At step S11, it is determined whether or not the travel time T is shorter than the shortest travel time $T_0$ multiplied by $\sqrt{3/2}$; if YES, the process proceeds to step S12, and if NO, the process proceeds to step S14. In the present embodiment, acceleration profiles A(t) of different shapes and velocity profiles of different shapes are generated according to YES or NO at step S11.

Figure 7:
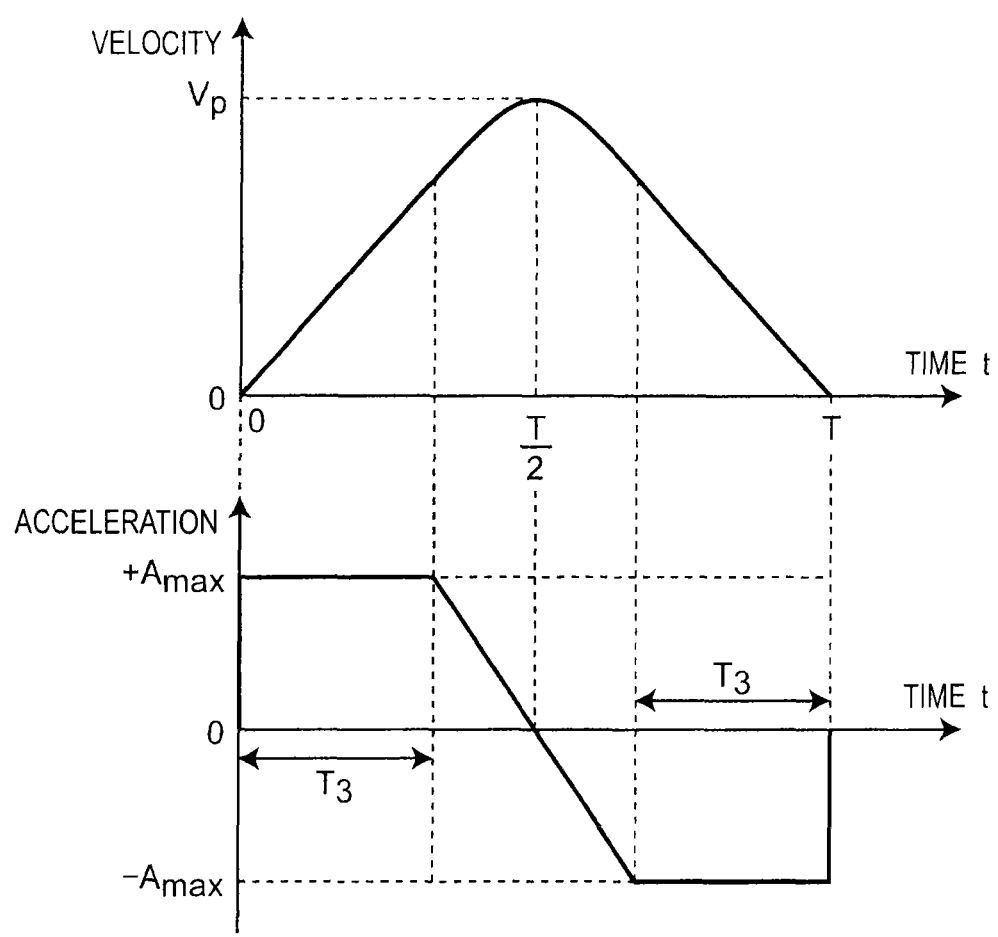
FIG. 7 is a schematic diagram showing an acceleration profile determined at step S13 of FIG. 6, and a corresponding velocity profile.

When YES at step S11, i.e., when the travel time T satisfies: $T_0 < T < \sqrt{3/2} \times T_0$, an acceleration profile A(t) includes: a first constant acceleration time during which a mechanical load 3 is accelerated at a positive first acceleration; a negatively accelerated time during which the acceleration applied to the mechanical load 3 is continuously decreased from the first acceleration to a negative second acceleration as a linear function of time; and a second constant acceleration time during which the mechanical load 3 is decelerated at the second acceleration. The absolute value of the first and second accelerations is an upper limit acceleration $A_{max}$. At steps S12 to S13, an acceleration profile A(t) as shown in FIG. 7 is generated.

At step S12, first and second constant acceleration times $T_3$ are computed as follows.

[Math. 12]

$$T_3 = \frac{T}{2} - \frac{\sqrt{3(T^2 - T_0^2)}}{2} \quad (15)$$

At step S13, with respect to time t within: $0 \leq t \leq T$, an acceleration profile A(t) is determined based on the constant acceleration time $T_3$ as follows.

[Math. 13]

$$A(t) = \begin{cases} +A_{max} & (0 \leq t \leq T_3) \\ -\dfrac{2A_{max}}{T - 2T_3}(t - T_3) + A_{max} & (T_3 < t \leq T - T_3) \\ -A_{max} & (T - T_3 < t \leq T) \end{cases} \quad (16)$$

Figure 8:
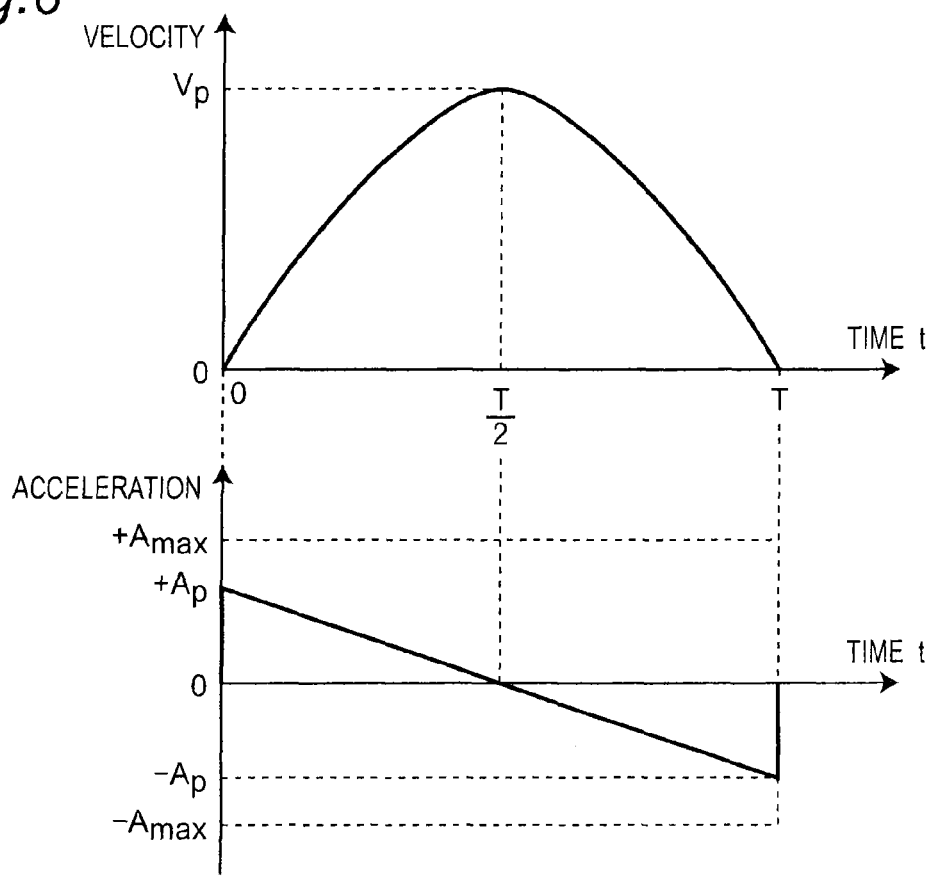
FIG. 8 is a schematic diagram showing an acceleration profile determined at step S15 of FIG. 6, and a corresponding velocity profile.

On the other hand, when NO at step S11, i.e., when the travel time T satisfies: $T \geq \sqrt{3/2} \times T_0$, the command value generating circuit 7 determines a certain peak acceleration $A_p$ lower than the upper limit acceleration $A_{max}$, and then, determines an acceleration profile A(t) using the peak acceleration $A_p$. The acceleration profile A(t) is determined such that the mechanical load 3 starts to be accelerated at the peak acceleration $A_p$ from a stop at a first position, and then, the acceleration applied to the mechanical load 3 is continuously decreased from $A_p$ to $-A_p$ as a linear function of time, and finally, the mechanical load 3 is decelerated at the peak acceleration $A_p$ to stop at a second position. At steps S14 to S15, an acceleration profile A(t) shown in FIG. 8 is generated.

At step S14, the peak acceleration $A_p$ is computed as follows.

$$A_p = 6D/T^2 \quad (17)$$

At step S15, with respect to time t within: $0 \leq t \leq T$, an acceleration profile A(t) is determined based on the peak acceleration $A_p$ as follows.

[Math. 14]

$$A(t) = -\frac{2A_p}{T}\left(t - \frac{T}{2}\right) \quad (18)$$

In the flowchart of FIG. 6, steps S6 to S7 are substantially the same as those of the first embodiment (FIG. 2). At step S6, a velocity profile is determined by integrating the acceleration profile A(t) determined at step S13 or S15. At step S7, a position command value 24 is generated by integrating the velocity profile, and the process ends.

Next, the advantageous effects of the motor control apparatus according to the present embodiment is described below.

First, it can be seen that the following mathematical expression holds for the acceleration profile A(t) determined by the mathematical expression (16) or (18).

[Math. 15]

$$D = \int_0^T \left(\int_0^t A(s)\,ds\right) dt \quad (19)$$

That is, when using the acceleration profile A(t) determined by the mathematical expression (16) or (18), it is possible to move the travel distance D in the travel time T. The constant acceleration time $T_3$ of the mathematical expression (16), or the peak acceleration $A_p$ of the mathematical expression (18) is determined so as to move the travel distance D in the travel time T.

Next, we explain that the acceleration profile A(t) determined by the mathematical expression (16) or (18) does not exceed the upper limit acceleration $A_{max}$. FIG. 7 is a schematic diagram showing the acceleration profile A(t) determined at step S13 of FIG. 6 (the mathematical expression (16)), and a corresponding velocity profile. As shown in FIG. 7, the absolute value of an acceleration reaches the upper limit acceleration $A_{max}$ only during the first and second constant acceleration times, and is always less than the upper limit acceleration $A_{max}$ during the negatively accelerated time. Therefore, obviously, the acceleration profile A(t) of FIG. 7 does not exceed the upper limit acceleration $A_{max}$. FIG. 8 is a schematic diagram showing the acceleration profile A(t) determined at step S15 of FIG. 6 (the mathematical expression (18)), and a corresponding velocity profile. As shown in FIG. 8, the absolute value of an acceleration reaches the peak acceleration $A_p$ only at time t=0 and T. The peak acceleration $A_p$ satisfies the following mathematical expression.

[Math. 16]

$$A_p = \frac{6D}{T^2} \leq 6D \cdot \frac{1}{T_0^2} \cdot \frac{2}{3} = \frac{4D}{T_0^2} = A_{max} \quad (20)$$

In this case, the inequality in the mathematical expression (20) holds from the fact that the travel time T satisfies: $T \geq \sqrt{3/2} \times T_0$. Thus, the peak acceleration $A_p$ does not exceed the upper limit acceleration $A_{max}$. In this case, the inequality holds from NO at step S11 of FIG. 6, i.e., $T > \sqrt{3/2} \times T_0$. Thus, when performing the position command value generating process of FIG. 6, it is possible to generate an acceleration profile A(t) not exceeding the upper limit acceleration $A_{max}$, regardless of which one of branches, steps S12 to S13, or steps S14 to S15, is performed according to the condition at step S11.

Next, we explain that the electric energy consumption can be reduced by performing the positioning control using the acceleration profile A(t) determined by the mathematical expression (16) or (18). As described in the first embodiment, the amount of electric energy required for the positioning control includes the amount of electric energy for the motor output and the amount of electric energy for the losses. As described above, the amount of electric energy for the motor output is substantially equal to kinetic energy determined by a peak velocity. On the other hand, losses during acceleration are dominant in the amount of electric energy for the losses, and electric power loss can be computed from a current flowing during acceleration.

First, a peak velocity $V_p = V_{p1}$ obtained when using the acceleration profile A(t) of the mathematical expression (16) is calculated. The peak velocity $V_{p1}$ is obtained by integrating the mathematical expression (16) over the time during which a positive acceleration is applied (from time 0 to T/2, i.e., one-half of the travel time) as follows.

[Math. 17]

$$\begin{aligned} V_{p1} &= \int_0^{T/2} A(t)\,dt \\ &= A_{max}T_3 + \int_{T_3}^{T/2}\left(-\frac{2A_{max}}{T-2T_3}(t-T_3) + A_{max}\right)dt \\ &= \frac{A_{max}}{2}\left(t - \frac{\sqrt{3}}{2}\sqrt{T^2 - T_0^2}\right) \\ &= \frac{A_{max}}{2}T\left(1 - \frac{\sqrt{3}}{2}\sqrt{1 - \left(\frac{T_0}{T}\right)^2}\right) \end{aligned} \quad (21)$$

In addition, the amount of electric energy for the losses is determined by integrating the electric power loss L of the mathematical expression (11) over the positive acceleration time (0≤t≤T/2). In this case, based on the fact that the acceleration is roughly proportional to the current, the amount of electric energy for the losses $E_{L1}$ occurring during the positioning control using the acceleration profile A(t) of the mathematical expression (16) is given as follows.

[Math. 18]

$$E_{L1} = \int_0^{T/2} R \cdot I^2 \, dt \qquad (22)$$

$$= \int_0^{T/2} R \cdot \left\{ \frac{J}{K_T} a(t) \right\}^2 dt$$

$$= \frac{16 R J^2 D^2}{K_T^2} \cdot \frac{1}{T_0^3} \cdot \left( \frac{T}{T_0} - \frac{2}{3} \sqrt{3 \left( \frac{T^2}{T_0^2} - 1 \right)} \right)$$

Next, for comparison, we compute the electric energy consumption obtained when performing the positioning control using a triangular velocity profile common for the positioning control. When performing the positioning control using a velocity profile indicated by a solid line of FIG. 3, and a movement of a travel distance D is made in the travel time T, the amount of electric energy for the motor output and the amount of electric energy for the losses are computed as follows.

In the first embodiment, the velocity profile becomes triangular, when the acceleration "a" of FIG. 4 satisfies: $a = A_{min}$. In this case, a peak velocity $V_{p2}$ and the amount of electric energy for the losses $E_{L2}$ are computed as follows.

[Math. 19]

$$V_{p2} = \frac{T}{2} A_{min} \qquad (23)$$

$$= \frac{T}{2} \cdot \frac{T_0^2}{T^2} A_{max}$$

$$= \frac{A_{max}}{2} T \left( \frac{T_0}{T} \right)^2$$

[Math. 20]

$$E_{L2} = \int_0^{T/2} R \cdot I^2 \, dt \qquad (24)$$

$$= \int_0^{T/2} R \cdot \left\{ \frac{J}{K_T} a(t) \right\}^2 dt$$

$$= \frac{16 R J^2 D^2}{K_T^2} \cdot \frac{1}{T^3}$$

$$= \frac{16 R J^2 D^2}{K_T^2} \cdot \frac{1}{T_0^3} \cdot \left( \frac{T_0}{T} \right)^3$$

In this case, let $r = T/T_0$, the mathematical expressions (21) to (24) can be rewritten as follows.

[Math. 21]

$$V_{p1} = \frac{A_{max}}{2} T \left( 1 - \frac{\sqrt{3}}{2} \sqrt{1 - \frac{1}{r^2}} \right) \qquad (25)$$

[Math. 22]

$$E_{L1} = \frac{16 R J^2 D^2}{K_T^2} \cdot \frac{1}{T_0^3} \cdot \left( r - \frac{2}{3} \sqrt{3(r^2 - 1)} \right) \qquad (26)$$

[Math. 23]

$$V_{p2} = \frac{A_{max}}{2} T \frac{1}{r^2} \qquad (27)$$

[Math. 24]

$$E_{L2} = \frac{16 R J^2 D^2}{K_T^2} \cdot \frac{1}{T_0^3} \cdot r^3 \qquad (28)$$

In order to compare the magnitudes of the peak velocities $V_{p1}$ and $V_{p2}$, and compare the magnitudes of the amounts of electric energy for the losses $E_{L1}$ and $E_{L2}$, we use the following functions with respect to the parameter $r = T/T_0$.

[Math. 25]

$$f_1(r) = 1 - \frac{\sqrt{3}}{2} \sqrt{1 - \frac{1}{r^2}} \qquad (29)$$

[Math. 26]

$$g_1(r) = r - \frac{2}{3} \sqrt{3(r^2 - 1)} \qquad (30)$$

[Math. 27]

$$f_2(r) = \frac{1}{r^2} \qquad (31)$$

[Math. 28]

$$g_2(r) = r^3 \qquad (32)$$

Using the mathematical expressions (29) to (32), the mathematical expressions (25) to (28) are rewritten as follows.

[Math. 29]

$$V_{p1} = \frac{A_{max}}{2} T \cdot f_1(r) \qquad (33)$$

[Math. 30]

$$E_{L1} = \frac{16 R J^2 D^2}{K_T^2} \cdot \frac{1}{T_0^3} \cdot g_1(r) \qquad (34)$$

[Math. 31]

$$V_{p2} = \frac{A_{max}}{2} T \cdot f_2(r) \qquad (35)$$

[Math. 32]

$$E_{L2} = \frac{16 R J^2 D^2}{K_T^2} \cdot \frac{1}{T_0^3} \cdot g_2(r) \qquad (36)$$

Figure 9:
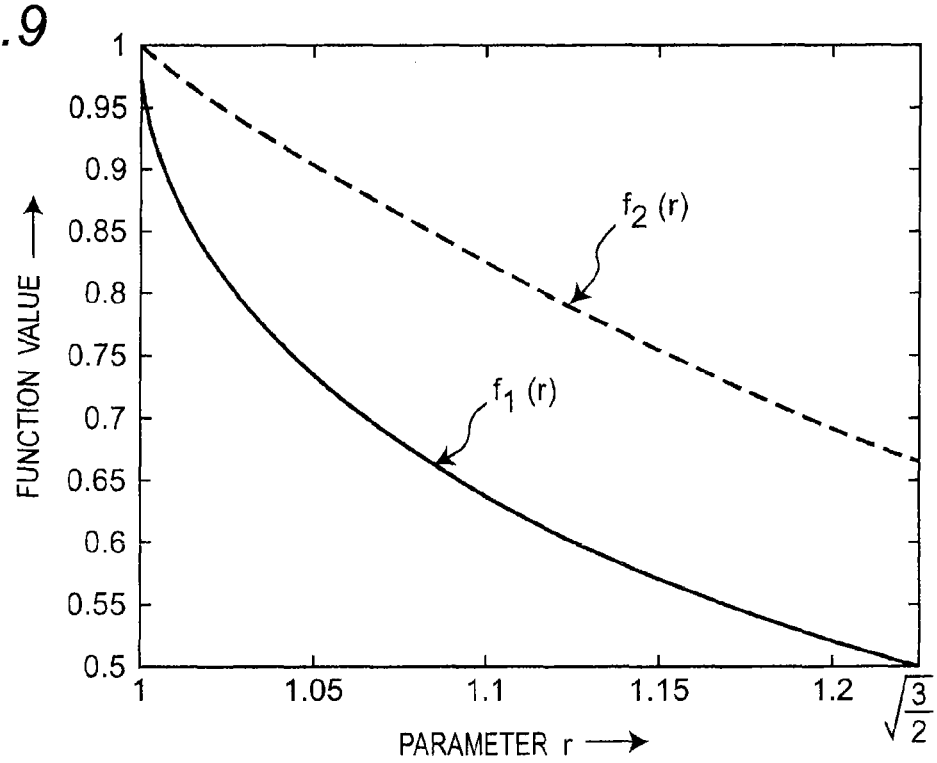
FIG. 9 is a schematic diagram in explanation of the effects of the position command value generating process of FIG. 6, and shows changes in values of functions $f_1(r)$ and $f_2(r)$, with respect to a parameter r indicating the ratio of travel time T to a shortest travel time $T_0$.

Since the acceleration profile A(t) of the mathematical expression (16) is used when YES at step S11 of FIG. 6, the parameter $r = T/T_0$ satisfies: $1 < r < \sqrt{3/2}$. FIG. 9 is a schematic diagram showing changes in the values of functions $f_1(r)$ and $f_2(r)$ with respect to the parameter r. Referring to FIG. 9, the solid line indicates the function $f_1(r)$, and the dashed line indicates the function $f_2(r)$. According to FIG. 9, it can be seen that $f_1(r) < f_2(r)$, regardless of the value of the parameter r, for $1 < r < \sqrt{3/2}$. This means that the peak velocity $V_{p1}$ obtained when performing the positioning control using the acceleration profile A(t) of the mathematical expression (16) is lower than the peak velocity $V_{p2}$ obtained when performing the positioning control using the triangular velocity profile, and therefore, the amount of electric energy for the motor output obtained when performing the positioning control using the acceleration profile A(t) of the mathematical expression (16) is also smaller than that obtained when performing the positioning control using the triangular velocity profile.

Figure 10:
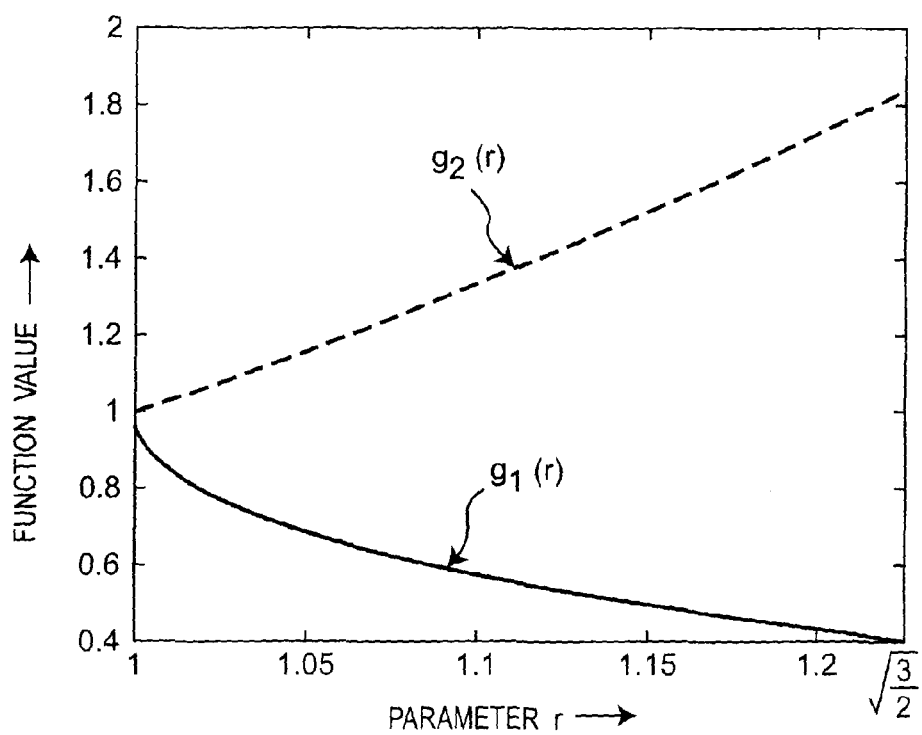
FIG. 10 is a schematic diagram in explanation of the effects of the position command value generating process of FIG. 6, and shows changes in values of functions $g_1(r)$ and $g_2(r)$, with respect to the parameter r indicating the ratio of the travel time T to the shortest travel time $T_0$.

FIG. 10 is a schematic diagram showing changes in the values of functions $g_1(r)$ and $g_2(r)$ with respect to the parameter r. Referring to FIG. 10, the solid line indicates the function $g_1(r)$, and the dashed line indicates the function $g_2(r)$. According to FIG. 10, it can be seen that $g_1(r)<g_2(r)$, regardless of the value of the parameter r, for $1<r<\sqrt{3/2}$. This indicates that the amount of electric energy for the losses $E_{L1}$ occurring during the positioning control using the acceleration profile A(t) of the mathematical expression (16) is smaller than the amount of electric energy for the losses $E_{L2}$ occurring during the positioning control using the triangular velocity profile.

As described above, both the amounts of electric energy for the motor output and for the losses are reduced when performing the positioning control using the acceleration profile A(t) of the mathematical expression (16), than when performing the positioning control using the triangular velocity profile. Thus, it can be said that the total amount of electric energy is also reduced.

Further, we calculate a peak velocity $V_{p3}$ obtained when performing the positioning control using the acceleration profile A(t) of the mathematical expression (18), and the amount of electric energy for the losses $E_{L3}$ occurring at that time. First, the peak velocity $V_{p3}$ is obtained by integrating the mathematical expression (18) over the time during which a positive acceleration is applied (from time 0 to T/2, i.e., one-half of the travel time) as follows.

[Math. 33]

$$V_{p3} = \int_0^{T/2} A(t)dt \qquad (37)$$
$$= \frac{1}{4}A_p T$$
$$= \frac{3}{2}\frac{D}{T}$$
$$= \frac{3}{8}A_{max}T \cdot \left(\frac{T_0}{T}\right)^2$$

In addition, the amount of electric energy for the losses $E_{L3}$ occurring during the positioning control using the acceleration profile A(t) of the mathematical expression (18) is given as follows.

[Math. 34]

$$E_{L3} = \int_0^{T/2} R \cdot I^2 dt \qquad (38)$$
$$= \int_0^{T/2} R \cdot \left\{\frac{J}{K_T}a(t)\right\}^2 dt$$
$$= \frac{16RJ^2D^2}{K_T^2} \cdot \frac{6}{16}\frac{1}{T^3}$$

Obviously, it holds that $V_{p3}<V_{p2}$ and $E_{L3}<E_{L2}$. This indicates that both the amounts of electric energy for the motor output and for the losses are reduced when performing the positioning control using the acceleration profile A(t) of the mathematical expression (18), than when performing the positioning control using the triangular velocity profile.

As described above, by generating a position command value according to the position command value generating process of FIG. 6, there is an advantageous effect of reducing the amount of electric energy required for positioning while maintaining the peak acceleration at the upper limit acceleration $A_{max}$ or less. In addition, the mathematical expressions (15) to (18) do not include iterations, etc., during their computation, but include only algebraic operations. Therefore, there is such an advantageous effect that a position command value 24 can be generated with a small computation load.

As described above, according to the motor control apparatus of the present embodiment, it is possible to reduce the electric energy consumption during the positioning control.

Third Embodiment

The advantageous effects of the first and second embodiments are explained by quantitatively computing the electric energy consumption occurring during the positioning control to show a reduction in the electric energy consumption. In the present embodiment, its advantageous effects are explained in a different manner. A positioning system including a motor control apparatus according to a third embodiment is configured in a manner similar to that of the first embodiment (FIG. 1), except that a command value generating circuit 7 performs a position command value generating process different from that of the first embodiment.

Figure 11:
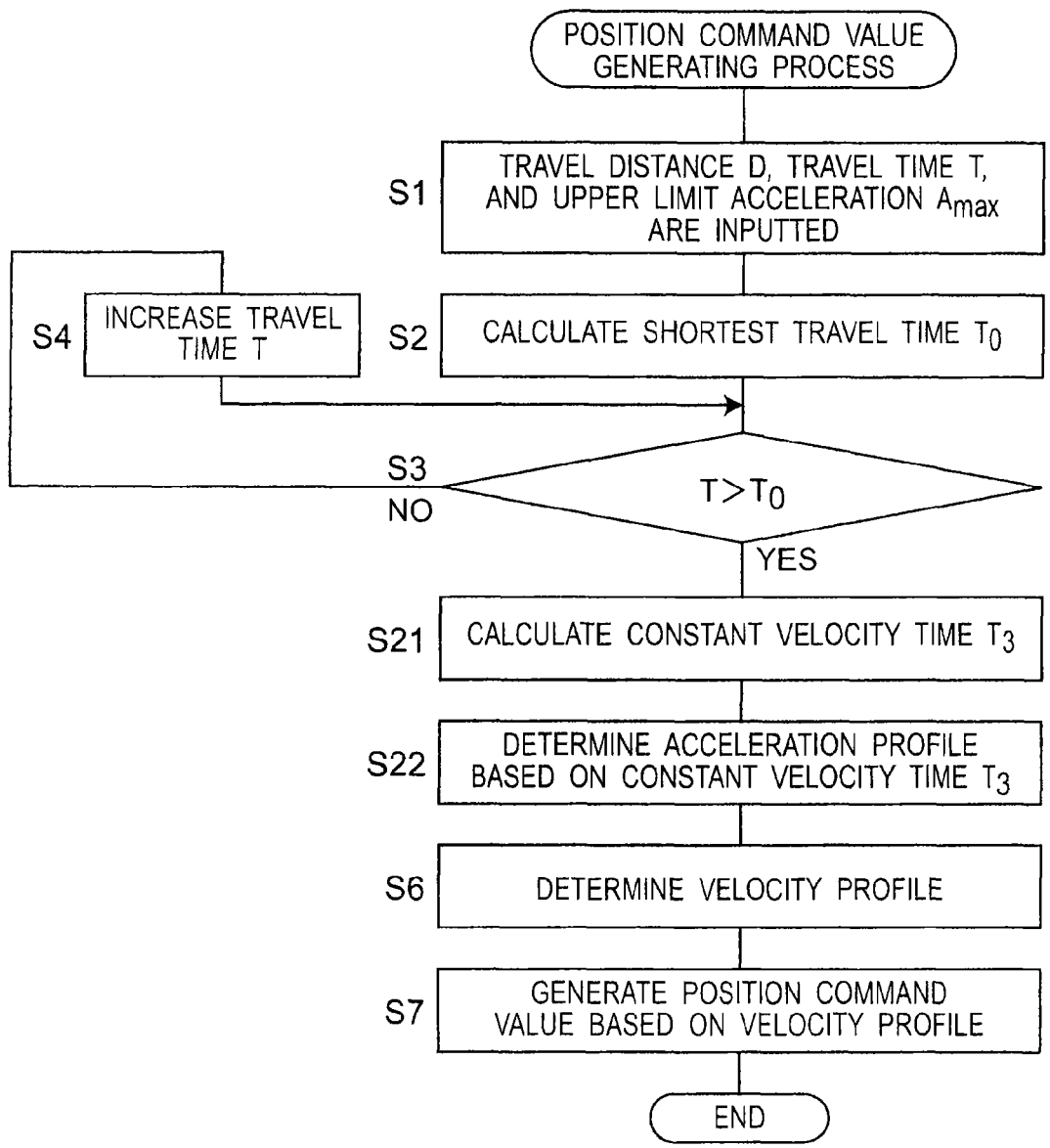
FIG. 11 is a flowchart showing a position command value generating process according to a third embodiment of the present invention.
Figure 12:
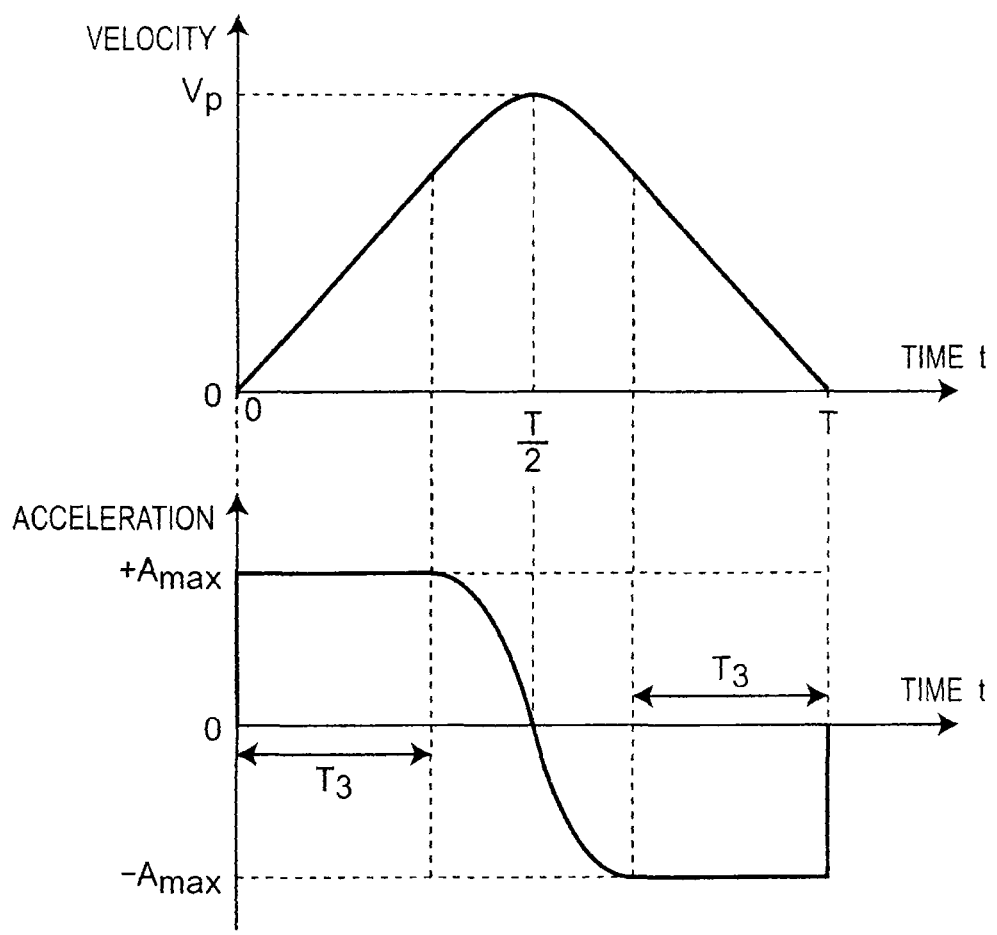
FIG. 12 is a schematic diagram showing an acceleration profile determined at step S22 of FIG. 11, and a corresponding velocity profile.

FIG. 11 is a flowchart showing a position command value generating process according to the third embodiment of the present invention. In the flowchart of FIG. 11, steps S1 to S4 are the same as those of the first embodiment (FIG. 2), and their explanations are omitted. When YES at step S3, the process proceeds to step S21. At steps S21 to S22, an acceleration profile A(t) is determined. The acceleration profile A(t) includes: a first constant acceleration time during which a mechanical load 3 is accelerated at a positive first acceleration; a negatively accelerated time during which the acceleration applied to the mechanical load 3 is continuously decreased from the first acceleration to a negative second acceleration; and a second constant acceleration time during which the mechanical load 3 is decelerated at the second acceleration. The absolute value of the first and second accelerations is an upper limit acceleration $A_{max}$. The acceleration profile A(t) is generated, for example, as shown in FIG. 12.

At step S21, first and second constant acceleration times $T_3$ are computed as follows.

[Math. 35]

$$T_3 = \frac{T}{2} - \frac{\sqrt{T^2 - T_0^2}}{2(1 - 8/\pi^2)} \qquad (39)$$

At step S22, with respect to time t within: $0 \le t \le T$, an acceleration profile A(t) is determined based on the constant acceleration time $T_3$ as follows.

[Math. 36]

$$A(t) = \begin{cases} +A_{max} & (0 \le t \le T_3) \\ -A_{max} \cdot \sin\left(\frac{\pi(t - T/2)}{T - 2T_3}\right) & (T_3 < t \le T - T_3) \\ -A_{max} & (T - T_3 < t \le T) \end{cases} \qquad (40)$$

FIG. 12 is a schematic diagram showing the acceleration profile A(t) determined at step S22 of FIG. 11, and a corresponding velocity profile.

The acceleration profile A(t) is determined such that the acceleration is maintained at the upper limit acceleration $A_{max}$ over the constant acceleration time $T_3$ from starting to accelerate the mechanical load 3, and then, is gradually decreased from the upper limit acceleration $A_{max}$. The acceleration profile A(t) of the mathematical expression (40) is determined to move the mechanical load 3 from an initial position to a target position in the travel time T (i.e., to satisfy the mathematical expression (19)). In this case, the constant acceleration time $T_3$ of the mathematical expression (39) is obtained.

Here, although the acceleration profile A(t) of the mathematical expression (40) is used as an example, the acceleration profile is not limited thereto. Any acceleration profile may be used as long as the acceleration profile is determined such that the acceleration is maintained at the upper limit acceleration $A_{max}$ over the constant acceleration time $T_3$ from starting to accelerate the mechanical load 3, and then, is gradually decreased from the upper limit acceleration $A_{max}$. Other examples include an acceleration profile A(t) of FIG. 7 described in the second embodiment (the mathematical expression (16)).

Figure 13:
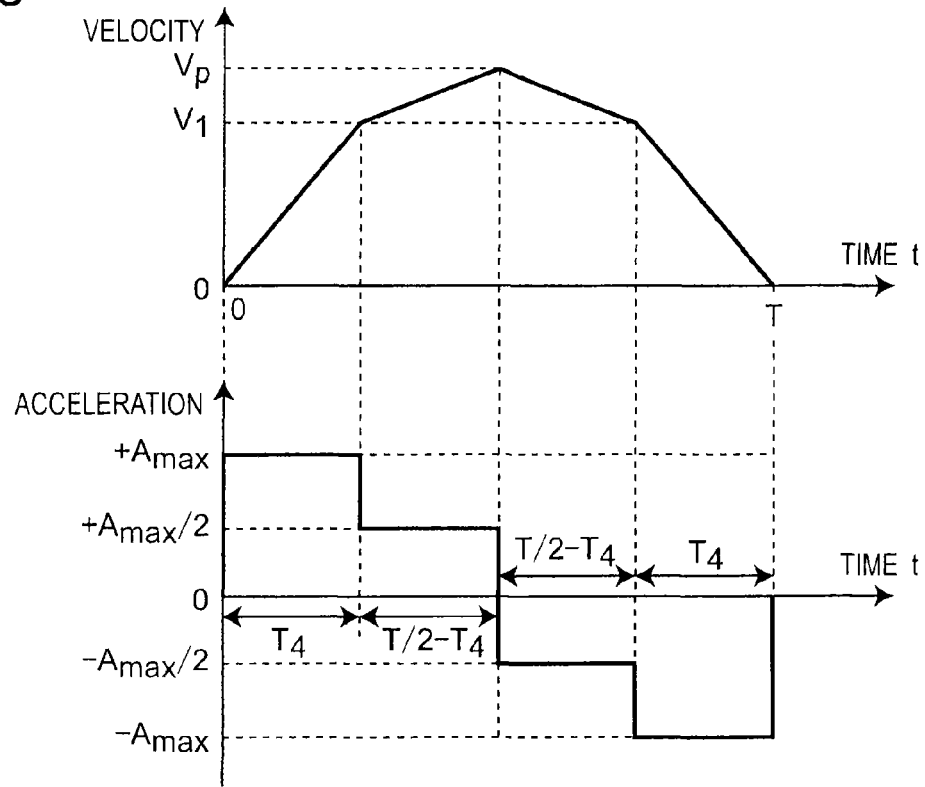
FIG. 13 is a schematic diagram showing an acceleration profile and a corresponding velocity profile, which are used in a position command value generating process according to a modified embodiment of the third embodiment of the present invention.

FIG. 13 is a schematic diagram showing an acceleration profile and a corresponding velocity profile, which are used in a position command value generating process according to a modified embodiment of the third embodiment of the present invention. An acceleration profile A(t) may have any other shape different from that described above, as long as the shape is determined such that the acceleration is maintained at an upper limit acceleration $A_{max}$ for a certain period of time from starting to accelerate the mechanical load 3, and then, is gradually decreased from the upper limit acceleration $A_{max}$. For example, the acceleration during the negatively accelerated time is not limited to being continuously decreased as shown in FIG. 12, and the acceleration may be decreased in a stepwise manner as shown in FIG. 13. The acceleration profile A(t) of FIG. 13 is given as follows.

[Math. 37]

$$A(t) = \begin{cases} +A_{max} & 0 \le t \le T_4 \\ +A_{max}/2 & T_4 < t \le T/2 \\ -A_{max}/2 & T/2 < t \le T - T_4 \\ -A_{max} & T - T_4 < t \le T \\ 0 & \text{The others} \end{cases} \quad (41)$$

The acceleration profile A(t) of the mathematical expression (41) is determined to move the mechanical load 3 from an initial position to a target position in the travel time T, i.e., to satisfy the following mathematical expression.

[Math. 38]

$$D = 2\left\{\frac{1}{2} \cdot A_{max} \cdot T_4^2 + A_{max} \cdot t \cdot \left(\frac{T}{2} - T_4\right) + \frac{1}{2} \cdot \frac{A_{max}}{2} \cdot \left(\frac{T}{2} - T_4\right)^2\right\} \quad (42)$$

In this case, a constant acceleration time $T_4$ is obtained as follows.

[Math. 39]

$$T_4 = \frac{T}{2} - \frac{1}{2}\sqrt{2 \cdot T^2 - \frac{8D}{A_{max}}} \quad (43)$$

Also when using the acceleration profile A(t) of the mathematical expression (41), it is possible to reduce the electric energy consumption during positioning operation.

Next, the advantageous effects of the motor control apparatus according to the present embodiment is described below.

Figure 14:
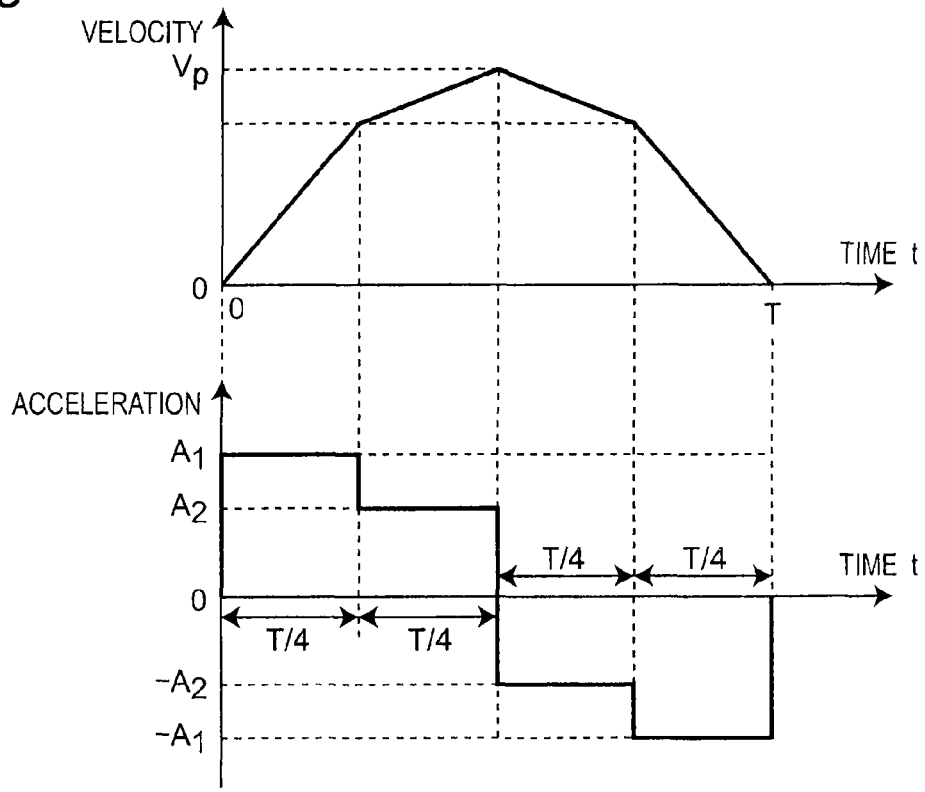
FIG. 14 is a schematic diagram showing a first acceleration profile and a velocity profile in explanation of effects according to the third embodiment of the present invention.
Figure 15:
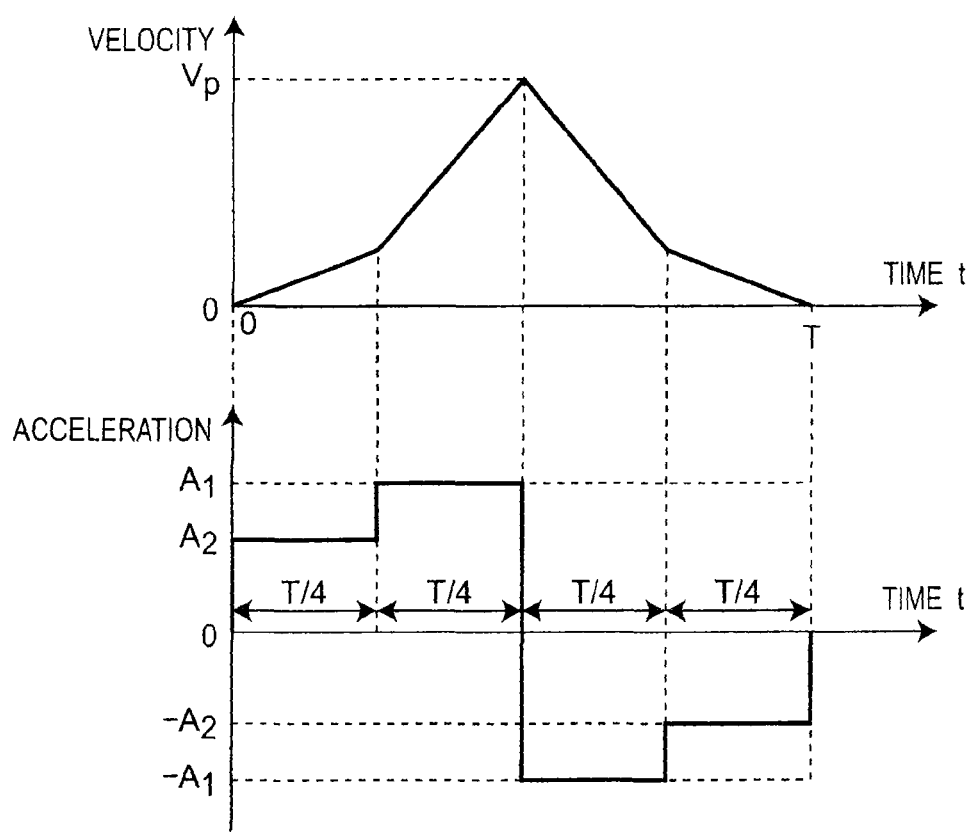
FIG. 15 is a schematic diagram showing a second acceleration profile and a velocity profile in explanation of the effects according to the third embodiment of the present invention.

With reference to FIGS. 14 and 15, we explain that the amount of electric energy required for the positioning control can be reduced by using an acceleration profile A(t) where the acceleration is maintained at the upper limit acceleration $A_{max}$ for a certain period of time from starting to accelerate the mechanical load 3, and then, is gradually decreased from the upper limit acceleration $A_{max}$. FIG. 14 is a schematic diagram showing a first acceleration profile A(t) and a velocity profile in explanation of effects according to the third embodiment of the present invention. FIG. 15 is a schematic diagram showing a second acceleration profile A(t) and a velocity profile in explanation of the effects according to the third embodiment of the present invention. In both cases of FIGS. 14 and 15, it is assumed that the same mechanical load 3 is moved in a travel time T using the same motor 1. It is assumed that for $A_1 > A_2 \ge 0$, the acceleration profile A(t) of FIG. 14 is given as follows.

[Math. 40]

$$A(t) = \begin{cases} +A_1 & 0 \le t \le T/4 \\ +A_2 & T/4 < t \le T/2 \\ -A_2 & T/2 < t \le (3/4)T \\ -A_1 & (3/4)T < t \le T \\ 0 & \text{The others} \end{cases} \quad (44)$$

In the acceleration profile A(t) of FIG. 14, a high acceleration is generated during a low velocity, and a low acceleration is generated during a high velocity. Therefore, in a positive acceleration time ($0 \le t \le T/2$), the high acceleration $A_1$ is generated during its first half ($0 \le t < T/4$), and the low acceleration $A_2$ is generated during its second half ($T/4 < 1 < T2$). In a negative acceleration time ($T/2 < t \le T$), the low acceleration $A_2$ is generated during its first half $T/2 < t \le (3/4)T$), and the high acceleration $A_1$ is generated during its second half ($(3/4)T < t \le T$).

In addition, it is assumed that the acceleration profile A(t) of FIG. 15 is given as follows.

[Math. 41]

$$A(t) = \begin{cases} +A_2 & 0 \le t \le T/4 \\ +A_1 & T/4 < t \le T/2 \\ -A_1 & T/2 < t \le (3/4)T \\ -A_2 & (3/4)T < t \le T \\ 0 & \text{The others} \end{cases} \quad (45)$$

In the acceleration profile A(t) of FIG. 15, a low acceleration is generated during a low velocity, and a high acceleration is generated during a high velocity. Therefore, in a positive acceleration time (0≤t≤T/2), the low acceleration $A_2$ is generated during its first half (0≤t<T/4), and the high acceleration $A_1$ is generated during its second half (T/4<t<T2). In a negative acceleration time (T/2<t≤T), the high acceleration $A_1$ is generated during its first half (T/2<t≤(3/4)T), and the low acceleration $A_2$ is generated during its second half (3/4)T<t≤T).

As described in the first embodiment, losses during accelerating operation are dominant in the amount of electric energy for the losses. Since the current is proportional to the acceleration as described above, both the amounts of electric energy for the losses occurring during the positioning control using the acceleration profile A(t) of FIG. 14, and using the acceleration profile A(t) of FIG. 15 are given as follows, using the sum J of moments of inertia of the mechanical load 3 and the motor 1, and using the torque constant $K_T$ of the motor 1.

[Math. 42]

$$\int_0^{T/2} R \cdot I^2 dt = \int_0^{T/4} R \cdot I^2 dt + \int_{T/4}^{T/2} R \cdot I^2 dt \quad (46)$$

$$= R\left(\frac{J}{K_T}\right)^2 (A_1^2 + A_2^2)\frac{T}{4}$$

That is, the same amounts of electric power loss occur in both cases when performing the positioning control using the acceleration profiles A(t) of FIG. 14, and when performing the positioning control using the acceleration profiles A(t) of FIG. 15.

Next, we consider distances to be moved when performing the positioning control using the acceleration profiles A(t) of FIGS. 14 and 15. When either acceleration profile A(t) of FIG. 14 or 15 is used, the peak velocity $V_p$ reaches $V_p=(A_1+A_2)\times T/4$ at the end of the positive acceleration time (t=T/2). In addition, the travel distance to move according to each acceleration profile A(t) corresponds to an area surrounded by the velocity profile's plot and its time axis. Therefore, according to FIGS. 14 and 15, it can be seen that movement of a longer distance is achieved when using the acceleration profile A(t) of FIG. 14. This results from the fact that a high acceleration is generated during a low velocity. Hence, it indicates that in order to achieve movement of a longer travel distance under the same amount of electric energy for the losses, it is more advantageous to use an acceleration profile A(t) as shown in FIG. 14, where a high acceleration is generated during a low velocity, and a low acceleration is generated during a high velocity. This fact indicates that the acceleration profile A(t) of FIG. 14 is more advantageous for reducing the amount of electric energy for the losses, when moving the same travel distance.

In addition, there is an advantageous effect of reducing the peak velocity by generating a high acceleration during a low velocity and generating a low acceleration during a high velocity, when moving the same travel distance. As described above, when assuming the same acceleration $A_1$, the same acceleration $A_2$, and the same travel times T in the examples of FIGS. 14 and 15, the travel distance becomes longer when using the acceleration profile A(t) of FIG. 14. In order to move the same travel distance D in the same travel time T when using the acceleration profiles A(t) of FIGS. 14 and 15, it is necessary that the accelerations of the acceleration profile A(t) of FIG. 14 (the accelerations $A_1$ and $A_2$ of FIG. 14) is lower than the accelerations of the acceleration profile A(t) of FIG. 15 (the accelerations $A_1$ and $A_2$ of FIG. 15). By decreasing the accelerations of the acceleration profile A(t) of FIG. 14, the peak velocity of FIG. 14 becomes lower than that of FIG. 15. Thus, it is possible to reduce the kinetic energy during the positioning control. As described in the first embodiment, since the kinetic energy can be considered to be the amount of electric energy for the motor output, there is an advantageous effect of reducing the amount of electric energy for the motor output.

The examples of FIGS. 14 and 15 have been explained with reference to the velocity profiles in each of which the travel time T is divided into four sections, each section being associated with a constant acceleration. However, the same argument applied to the case in which the travel time T is divided into more than four sections. That is, when using an acceleration profile having a high acceleration immediately after starting to accelerate and having a gradually decreasing acceleration thereafter, it is possible to reduce losses occurring during the positioning control and reduce the peak velocity of the velocity profile, as compared to the case of using a gradually increasing acceleration profile. This is because the former acceleration profile can generate a velocity as high as possible immediately after starting a positive acceleration time.

When the acceleration is constrained by an upper limit acceleration, it is possible to reduce losses occurring during the positioning control and reduce the peak velocity, while maintaining the acceleration at the upper limit acceleration or less, by performing the positioning control using an acceleration profile to generate an upper limit acceleration for a while immediately after starting to accelerate, and then generate a gradually decreasing acceleration from the upper limit acceleration. That is, it is possible to generate an acceleration profile to reduce the amount of electric energy required for the positioning control, while maintaining the acceleration at the upper limit acceleration or less. In addition, an acceleration profile A(t) including a first constant acceleration time, a negatively accelerated time, and a second constant acceleration time, which are represented by, for example, the mathematical expressions (39) and (40) or the mathematical expressions (41) and (43), does not use iterations, etc., during its computation, but uses only algebraic operations. Thus, there is such an advantageous effect that a position command value 24 can be computed with a small computation load.

As described above, according to the motor control apparatus of the present embodiment, it is possible to reduce the electric energy consumption during the positioning control.

Fourth Embodiment

Although the first to third embodiments are explained for the cases in which an acceleration profile is shaped such that its accelerating portion and its decelerating portion are symmetrical to each other (therefore, a velocity profile is also shaped such that its accelerating portion and its decelerating portion are symmetrical to each other), the embodiments of the present invention are not limited thereto. An acceleration profile may be shaped such that its accelerating portion and its decelerating portion are asymmetrical to each other. The case of using such an acceleration profile is described in the fourth embodiment.

Figure 16:
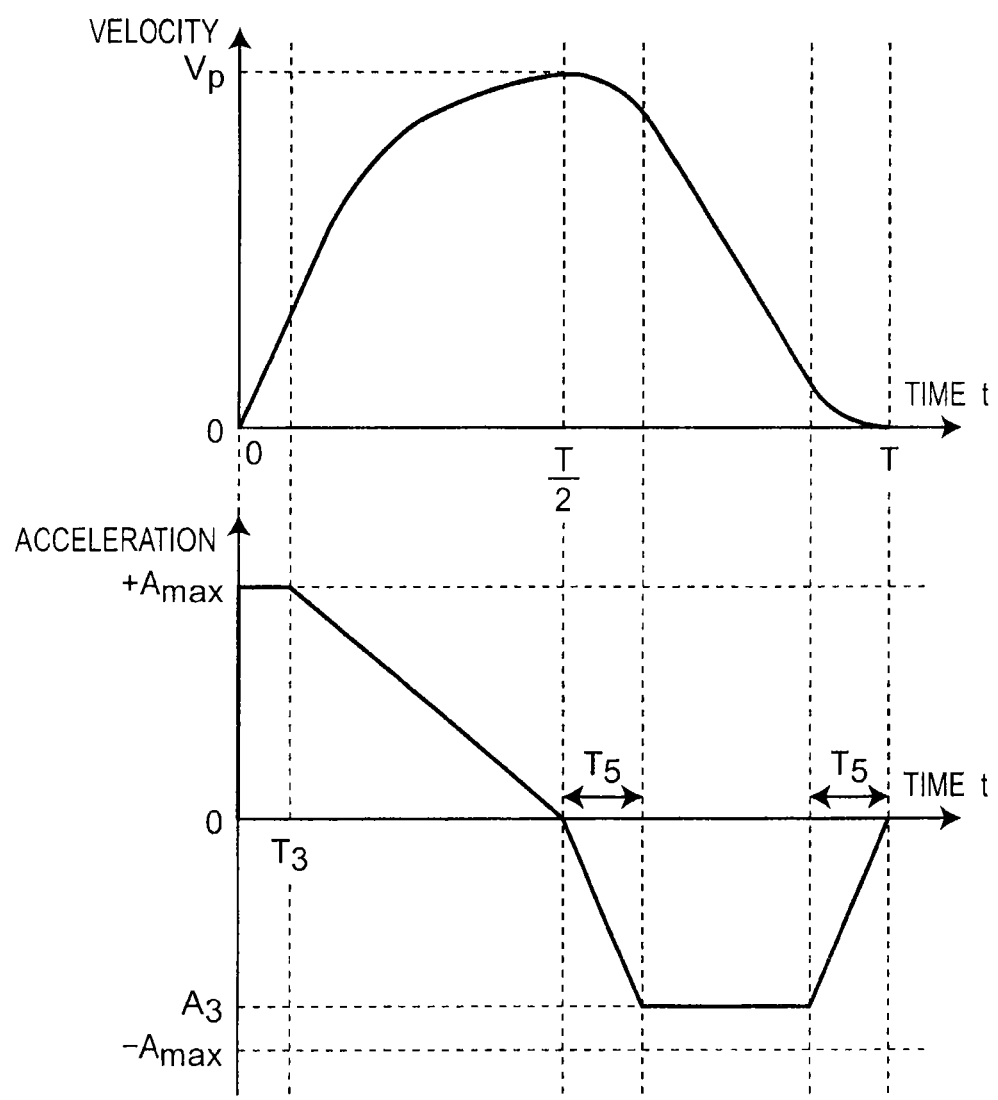
FIG. 16 is a schematic diagram showing an acceleration profile and a corresponding velocity profile, which are used in a position command value generating process according to a fourth embodiment of the present invention.

FIG. 16 is a schematic diagram showing an acceleration profile and a corresponding velocity profile, which are used in a position command value generating process according to the fourth embodiment of the present invention. The acceleration profile A(t) of FIG. 16 is given as follows.

[Math. 43]

$$A(t) = \begin{cases} +A_{max} & 0 \le t \le T_3 \\ -\dfrac{A_{max}}{T/2 - T_3}(t - T/2) & T_3 < t \le T/2 \\ -\dfrac{A_3}{T_5}(t - T/2) & T/2 < t \le T/2 + T_5 \\ -A_3 & T/2 + T_5 < t \le T - T_5 \\ \dfrac{A_3}{T_5}(t - T) & T - T_5 < t \le T \end{cases} \quad (47)$$

The acceleration profile A(t) of the mathematical expression (47) is also determined such that a mechanical load 3 is moved from an initial position to a target position in the travel time T, and that the acceleration is maintained at an upper limit acceleration $A_{max}$ for a certain period of time $T_3$ from starting to accelerate the mechanical load 3, and then, is gradually decreased from the upper limit acceleration $A_{max}$. In particular, the acceleration profile A(t) of the mathematical expression (47) has different shapes for acceleration and deceleration.

It is assumed that the time $T_3$ of the mathematical expression (47) is calculated using the mathematical expression (15).

In addition, an acceleration $A_3$ and time $T_5$ of the mathematical expression (47) are determined as follows.

In order not to cause shocks or vibrations during the positioning control, the continuous change in velocity is needed. To this end, it is necessary that a value obtained by integrating the acceleration profile over a positive accelerating time is equal to the absolute value of a value obtained by integrating the acceleration profile over a decelerating time with a negative acceleration. In the example of the mathematical expression (47), it is assumed that the accelerating time and the decelerating time are equal to each other, and thus, the accelerating time is $0 \le t < T/2$, and the decelerating time is $T/2 < t \le T$. That is, it is necessary that the following mathematical expression holds for the mathematical expression (47).

[Math. 44]

$$\int_0^{T/2} A(t)dt = |\int_{T/2}^T A(t)dt| \quad (48)$$

The value obtained by integrating the acceleration profile over the accelerating time is a peak velocity $V_p$. The portion corresponding to the accelerating time of the acceleration profile of the mathematical expression (47) is the same as the mathematical expression (16) of the second embodiment. Therefore, the left-hand side of the mathematical expression (48) can be calculated to obtain the following mathematical expression, in a manner similar to that of the mathematical expression (21).

[Math. 45]

$$\int_0^{T/2} A(t)dt = V_p = \dfrac{A_{max}}{2} T\left(1 - \dfrac{\sqrt{3}}{2}\sqrt{1 - \left(\dfrac{T_0}{T}\right)^2}\right) \quad (49)$$

In addition, the right-hand side of the mathematical expression (48) is computed to obtain the following mathematical expression.

[Math. 46]

$$\left|\int_{T/2}^T A(t)dt\right| = A_3\left(\dfrac{T}{2} - T_5\right) \quad (50)$$

Hence, in order for the mathematical expression (48) to hold, it is necessary that the acceleration $A_3$ and the time $T_5$ are selected to satisfy the following mathematical expression.

[Math. 47]

$$A_{max}\left(\dfrac{T}{2} - \dfrac{\sqrt{3(T^2 - T_0^2)}}{4}\right) = A_3\left(\dfrac{T}{2} - T_5\right) \quad (51)$$

It is noted that the acceleration profiles described in the first to third embodiments are shaped such that its accelerating portion and its decelerating portion are symmetrical to each other, and naturally, the velocity is also continuous.

Using the acceleration profile of the mathematical expression (47), the mechanical load 3 is moved over a travel distance D in the travel time T. In this case, as described above, the portion corresponding to the accelerating time of the acceleration profile of the mathematical expression (47) is the same as that described in the second embodiment. Therefore, the distance to move during the accelerating time is D/2. Hence, in order that the sum of distances to move during the accelerating time and the decelerating time when using the acceleration profile of the mathematical expression (47) becomes the travel distance D, it is necessary that the distance to move during the decelerating time is D/2. The distance to move during the decelerating time when using the acceleration profile of the mathematical expression (47) is given as follows, using the acceleration $A_3$ and the time $T_5$.

[Math. 48]

$$\dfrac{A_3}{8} T^2\left(1 - \dfrac{2T_5}{T}\right) \quad (52)$$

Therefore, in order to move the mechanical load 3 over the travel distance D in the travel time T using the acceleration profile of the mathematical expression (47), it is necessary to determine the acceleration $A_3$ and the time $T_5$ so as to satisfy the following mathematical expression.

[Math. 49]

$$\dfrac{A_3}{8} T^2\left(1 - \dfrac{2T_5}{T}\right) = \dfrac{D}{2} \quad (53)$$

The acceleration $A_3$ and the time $T_5$ are calculated by solving the simultaneous equations of the mathematical expressions (48) and (53), in unknowns $A_3$ and $T_5$. The acceleration profile of the mathematical expression (47) is determined using the acceleration $A_3$ and the time $T_5$. Then, a velocity profile is determined according to the acceleration profile A(t), and a position command value 24 is generated according to the velocity profile.

Next, the advantageous effects of the present embodiment is described below.

As described in the third embodiment, the electric energy consumption occurring during the positioning control is computed as the sum of the amount of electric energy for the motor output and the amount of electric energy for the losses. In addition, the amount of electric energy used during accelerating operation is dominant in both the amounts of electric energy for the motor output and for the losses. It is possible to reduce the amount of electric energy required during accelerating operation by determining an acceleration profile such that the acceleration is maintained at the upper limit acceleration $A_{max}$ for the period of time $T_3$ from starting to accelerate the mechanical load 3, and then, is gradually decreased from the upper limit acceleration $A_{max}$, as shown in the acceleration profile of the mathematical expression (47).

In addition, the parameters of the acceleration profile (acceleration $A_3$ and time $T_5$) are calculated such that the mechanical load 3 is moved over the travel distance D in the travel time T, and that the velocity profile is continuous over the travel time T. Therefore, by performing the positioning control using this acceleration profile, there is such an advantageous effect that no shock and vibration occurs during the positioning control, and it is possible to reduce the amount of electric energy required for the positioning control, while performing desired positioning control.

It is noted that the present embodiment describes an example in which accelerating time (positive acceleration time) and decelerating time (negative acceleration time) are equal to each other. However, even when the accelerating time and the decelerating time are different from each other, there is a similar advantageous effect to that of the above-described embodiment, i.e., an advantageous effect of reducing the electric energy consumption during operation, while performing desired positioning control, as long as an acceleration profile is determined such that the acceleration is maintained at the upper limit acceleration $A_{max}$ for a certain period of time from starting to accelerate the mechanical load 3, and then, is gradually decreased from the upper limit acceleration $A_{max}$. Further, the example of FIG. 16 describes the case of using an acceleration profile where the acceleration is maintained at the upper limit acceleration $A_{max}$ for a certain period of time from starting to accelerate the mechanical load 3, and then, is continuously decreased from the upper limit acceleration $A_{max}$. However, an acceleration profile where the acceleration is decreased in a stepwise manner, instead of being continuously decreased, may be used.

INDUSTRIAL APPLICABILITY

According to the present invention, regarding a technique for generating a position command value (or corresponding acceleration profile and velocity profile) used for the positioning control, the position command value is generated such that the amount of computations is reduced, and thus, the electric energy consumption during the positioning control can be reduced, while taking the constraint of an upper limit acceleration into consideration.

According to the present invention, it is possible to reduce the electric energy consumption by 14 to 25%, which is close to a numerical optimal solution, compared to conventional motor control apparatuses, and it is possible to provide an approximate solution to achieve a real-time and online implementation, which is difficult with a numerical optimal solution.

REFERENCE SIGNS LIST

1: MOTOR,
2: ENCODER,
3: MECHANICAL LOAD,
4: MOTOR DRIVER CIRCUIT,
5: POWER SUPPLY,
6: REGENERATIVE RESISTOR, and
7: COMMAND VALUE GENERATING CIRCUIT.

The invention claimed is:

1. A motor control apparatus for controlling a motor to move a mechanical load from a first position to a second position, the mechanical load being connected to the motor, the motor control apparatus comprising:
   a command value generating circuit configured to generate a position command value indicating a position of the mechanical load for each point of time, and the position command value serving as a reference signal for an operation of the mechanical load;
   a motor driver circuit configured to control the motor to move the mechanical load according to the position command value; and
   a resistor that consumes regenerative power,
   wherein:
   when a travel distance D, an upper limit acceleration $A_{max}$, and a travel time T are provided, the command value generating circuit is configured to:
   determine an acceleration profile A(t) indicating changes in acceleration of the mechanical load over time, such that an initial acceleration is set to the upper limit acceleration Amax and the acceleration is maintained at the upper limit acceleration $A_{max}$ for a constant acceleration time $T_3$ thereafter to accelerate the mechanical load, and then, the acceleration is continuously decreased at a predetermined slope from the upper limit acceleration $A_{max}$; and
   integrate the acceleration profile A(t) twice to generate the position command value,
   wherein the travel distance D is a distance from the first position to the second position,
   wherein the upper limit acceleration $A_{max}$ indicates an upper limit of an absolute value of the acceleration of the mechanical load, and corresponds to a second-order differential coefficient of the position command value, and
   wherein the travel time T is longer than a shortest travel time $T_0$ computed based on the travel distance D and the upper limit acceleration $A_{max}$,
   wherein the command value generating circuit is configured to determine the constant acceleration time $T_3$ to move the mechanical load from the first position to the second position in the travel time T.

2. The motor control apparatus as claimed in claim 1, wherein the shortest travel time $T_0$ is determined as: $T_0 = 2 \times \sqrt{D/A_{max}}$,
   wherein the command value generating circuit is configured to:
   determine the constant acceleration time $T_3$ using:

$$T_3 = \frac{T}{2} - \frac{\sqrt{3(T^2 - T_0^2)}}{2}$$

and,
determine the acceleration profile A(t) with respect to time t over 0≤t≤T, using:

$$A(t) = \begin{cases} +A_{max} & (0 \le t \le T_3) \\ -\dfrac{2A_{max}}{T-2T_3}(t-T_3) + A_{max} & (T_3 < t \le T-T_3) \\ -A_{max} & (T-T_3 < t \le T) \end{cases}.$$

3. The motor control apparatus as claimed in claim 1,
wherein the shortest travel time $T_0$ is determined as: $T_0 = 2 \times \sqrt{D/A_{max}}$,
wherein the command value generating circuit is configured to:
determine the constant acceleration time $T_3$ using:

$$T_3 = \dfrac{T}{2} - \dfrac{\sqrt{T^2 - T_0^2}}{2(1 - 8/\pi^2)}$$

and,
determine the acceleration profile A(t) with respect to time t over 0≤t≤T, using:

$$A(t) = \begin{cases} +A_{max} & (0 \le t \le T_3) \\ -A_{max} \cdot \sin\left(\dfrac{\pi(t-T/2)}{T-2T_3}\right) & (T_3 < t \le T-T_3) \\ -A_{max} & (T-T_3 < t \le T) \end{cases}.$$

4. A motor control apparatus for controlling a motor to move a mechanical load from a first position to a second position, the mechanical load being connected to the motor, the motor control apparatus comprising:
a command value generating circuit configured to generate a position command value indicating a position of the mechanical load for each point of time, and the position command value serving as a reference signal for an operation of the mechanical load;
a motor driver circuit configured to control the motor to move the mechanical load according to the position command value; and
a resistor that consumes regenerative power,
wherein:
when a travel distance D, an upper limit acceleration $A_{max}$, and a travel time T are provided, the command value generating circuit is configured to:
determine an acceleration profile A(t) indicating changes in acceleration of the mechanical load over time, and
integrate the acceleration profile A(t) twice to generate the position command value,
wherein the travel distance D is a distance from the first position to the second position,
wherein the upper limit acceleration $A_{max}$ indicates an upper limit of an absolute value of the acceleration of the mechanical load, and corresponds to a second-order differential coefficient of the position command value,
wherein the travel time T is longer than a shortest travel time $T_0 = 2 \times \sqrt{D/A_{max}}$ computed based on the travel distance D and the upper limit acceleration $A_{max}$,
wherein, when the travel time T satisfies: $T_0 < T < \sqrt{3/2} \times T_0$, the command value generating circuit is configured to:
determine the constant acceleration time $T_3$ using:

$$T_3 = \dfrac{T}{2} - \dfrac{\sqrt{3(T^2 - T_0^2)}}{2}$$

and,
determine the acceleration profile A(t) with respect to time t over 0≤t≤T, using:

$$A(t) = \begin{cases} +A_{max} & (0 \le t \le T_3) \\ -\dfrac{2A_{max}}{T-2T_3}(t-T_3) + A_{max} & (T_3 < t \le T-T_3) \\ -A_{max} & (T-T_3 < t \le T) \end{cases},$$

and
such that an initial acceleration is set to the upper limit acceleration $A_{max}$ and the acceleration is maintained at the upper limit acceleration $A_{max}$ for a constant acceleration time $T_3$ thereafter to accelerate the mechanical load, and then, the acceleration is continuously decreased at a redetermined slope from the upper limit acceleration $A_{max}$, and
wherein, when the travel time T satisfies: $T \ge \sqrt{3/2} \times T_0$, the command value generating circuit is configured to:
determine a peak acceleration $A_p$ lower than the upper limit acceleration $A_{max}$, using: $A_p = 6D/T^2$, and
determine the acceleration profile A(t) with respect to time t over 0≤t≤T, using:

$$A(t) = -\dfrac{2A_p}{T}\left(t - \dfrac{T}{2}\right)$$

such that the acceleration is continuously decreased at a predetermined slope from the peak acceleration $A_p$ since starting to accelerate the mechanical load.

5. The motor control apparatus as claimed in claim 1, wherein the command value generating circuit is further configured to adjust the travel time T to be longer than a shortest travel time $T_0$ computed based on the travel distance D and the upper limit acceleration $A_{max}$.

* * * * *